United States Patent
Kisner et al.

(10) Patent No.: US 8,796,634 B2
(45) Date of Patent: Aug. 5, 2014

(54) HIGH EFFICIENCY PROPORTIONAL NEUTRON DETECTOR WITH SOLID LINER INTERNAL STRUCTURES

(75) Inventors: Roger Allen Kisner, Knoxville, TN (US); David Eugene Holcomb, Oak Ridge, TN (US); Gilbert M. Brown, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 179 days.

(21) Appl. No.: 13/408,343

(22) Filed: Feb. 29, 2012

(65) Prior Publication Data

US 2012/0223242 A1    Sep. 6, 2012

Related U.S. Application Data

(60) Provisional application No. 61/447,756, filed on Mar. 1, 2011.

(51) Int. Cl.
*G01T 3/00* (2006.01)
(52) U.S. Cl.
CPC ..................................... *G01T 3/008* (2013.01)
USPC ..................................................... 250/390.01
(58) Field of Classification Search
CPC ............. H01J 47/1211; H01J 47/1222; H01J 47/1205; H01J 47/12; G01T 3/0008; G01T 3/00
USPC ..................................................... 250/390.01
See application file for complete search history.

(56) References Cited

FOREIGN PATENT DOCUMENTS

WO    WO 2011025853 A1 *   3/2011

OTHER PUBLICATIONS

Lintereur, A.T. et al., "Boron-Lined Neutron Detector Measurements" PNNL-18938 Report (Nov. 6, 2009).
Dighe, P.M., "New Cathode Design Boron Lined Proportional Counters for Neutron Area Monitoring Application" Nuclear Instruments and Methods in Physics Research, Section A (2007) pp. 461-465, vol. 575.
Dighe, P.M. et al., "Boron-Lined Proportional Counters with Improved Neutron sensitivity," Nuclear Instruments and Methods in Physics Research, Section A (2003) pp. 154-161, vol. 496.

* cited by examiner

*Primary Examiner* — Constantine Hannaher
(74) *Attorney, Agent, or Firm* — Scully, Scott, Murphy & Presser, P.C.

(57)    ABSTRACT

A tube-style neutron detector, a panel-style neutron detector incorporating a plurality of tube-style neutron detectors, and a panel-style neutron detector including a plurality of anode wires are provided. A plurality of channels is provided in a neutron detector such that each channel has an inner surface of a coating layer including a neutron-absorbing material. A wire anode is provided at end of each channel so that electrons generated by a charged daughter particle generated by a neutron are collected to detect a neutron-matter interaction. Moderator units can be incorporated into a neutron detector to provide improved detection efficiencies and/or to determine neutron energy spectrum. Gas-based proportional response from the neutron detectors can be employed for special nuclear material (SNM) detection. This neutron detector can provide similar performance to $^3$He-based detectors without requiring $^3$He and without containing toxic, flammable, or high-pressure materials.

56 Claims, 28 Drawing Sheets

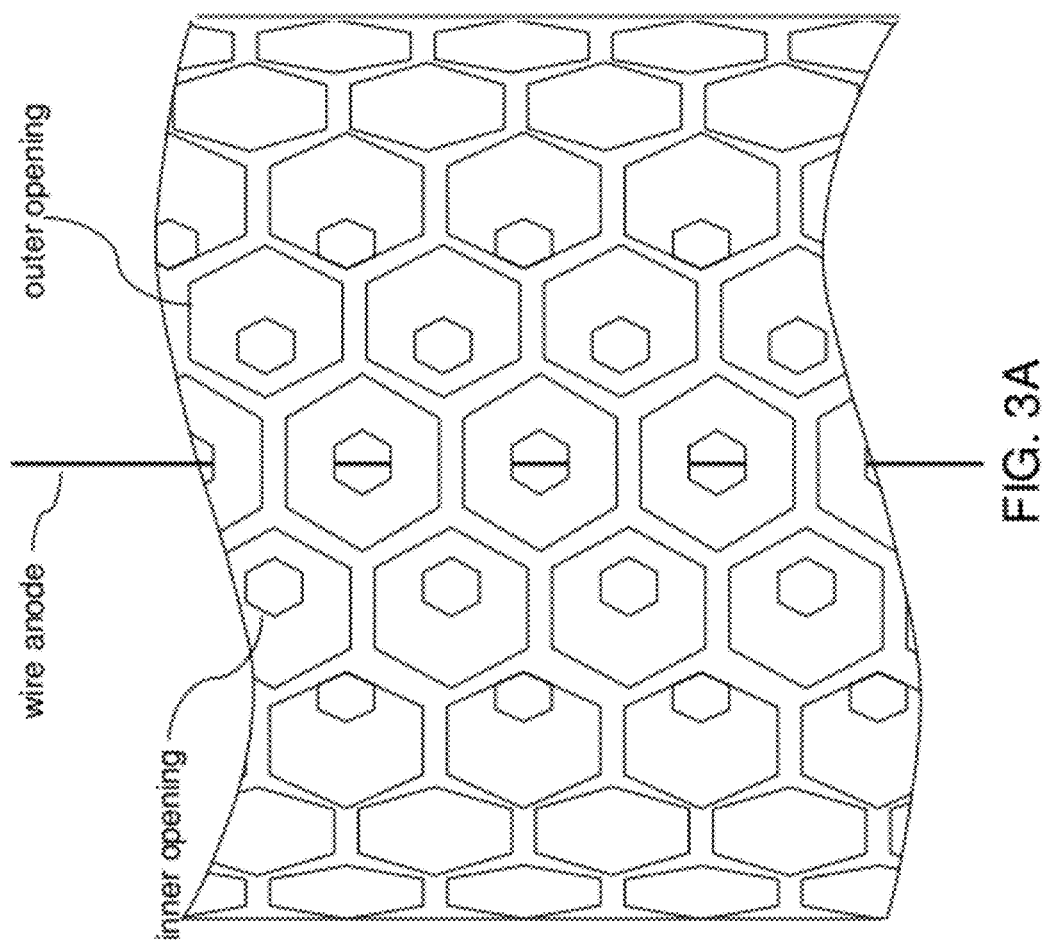

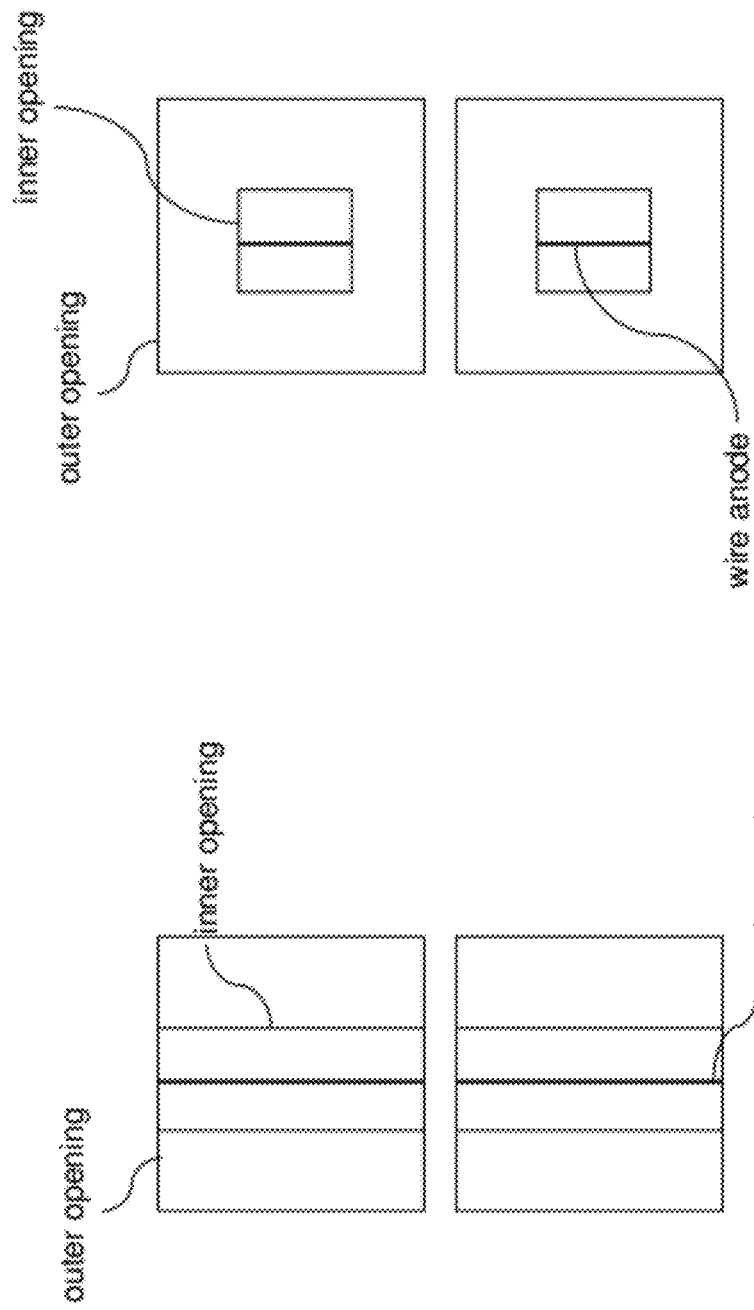

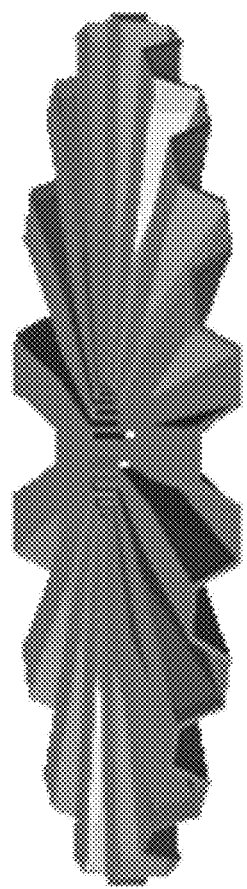
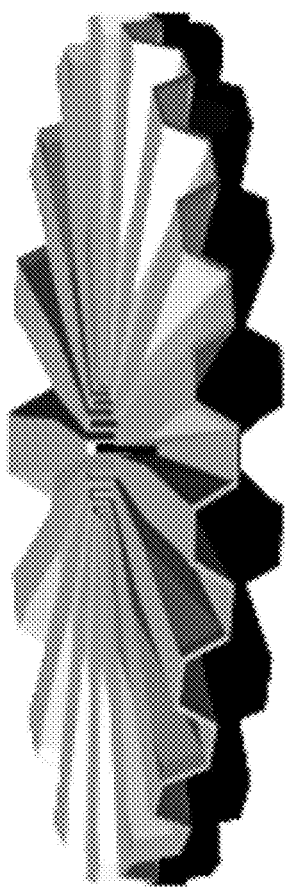
FIG. 6A
FIG. 6B

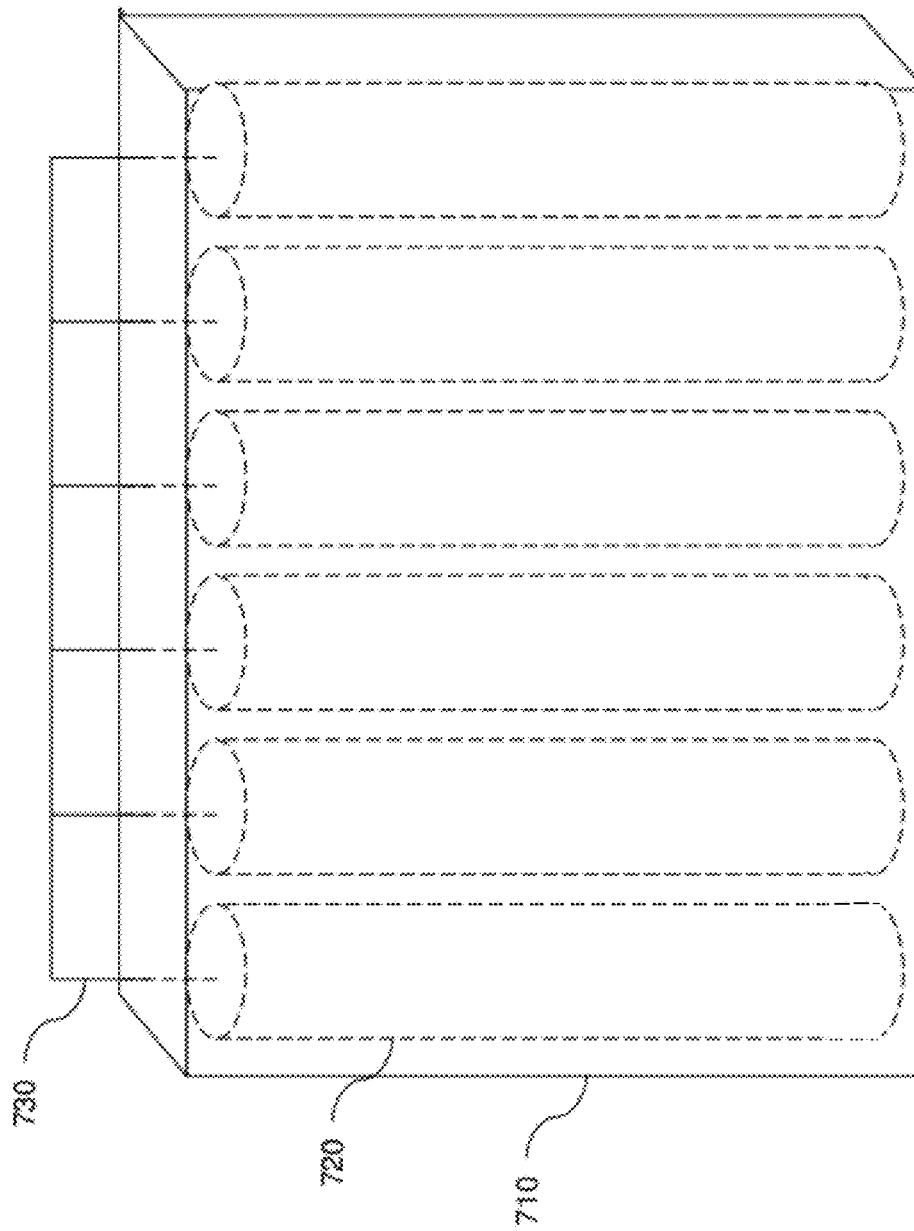

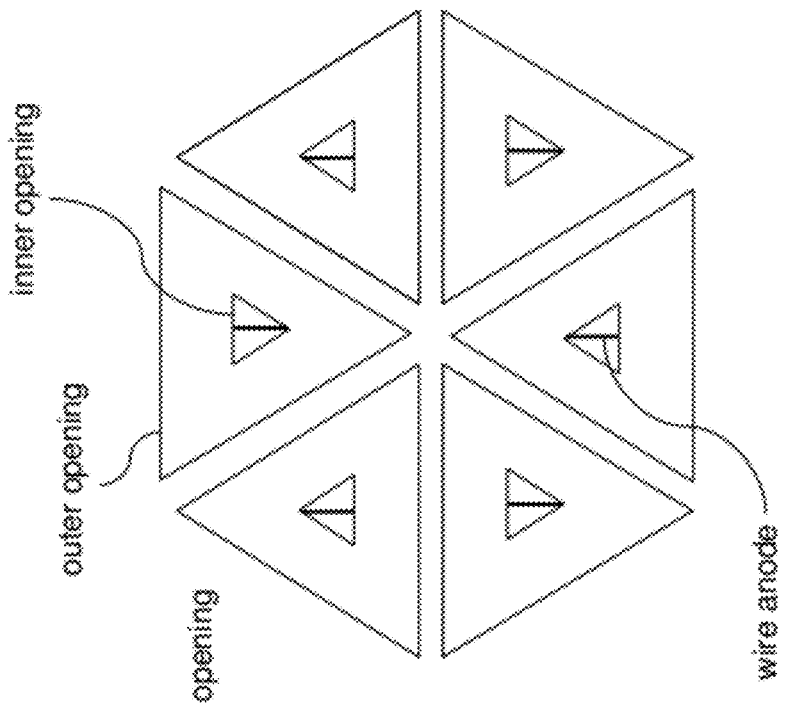
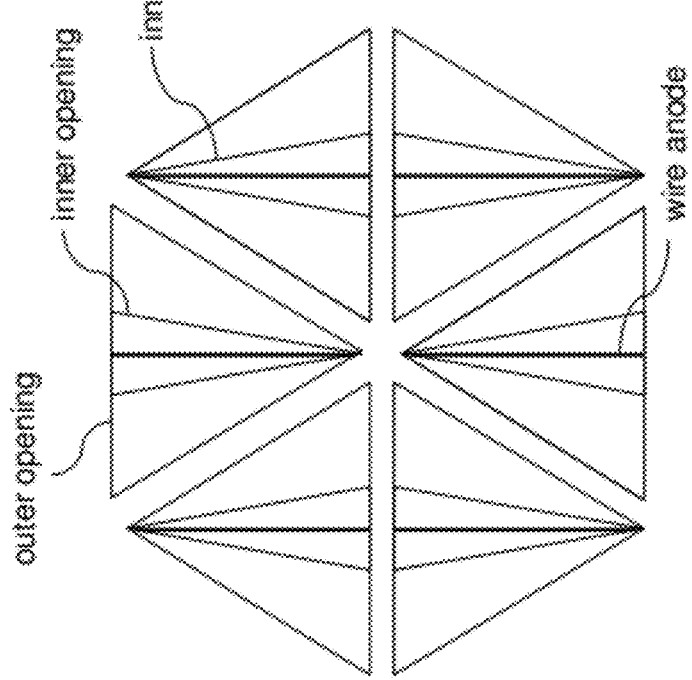
FIG. 8D
FIG. 8E

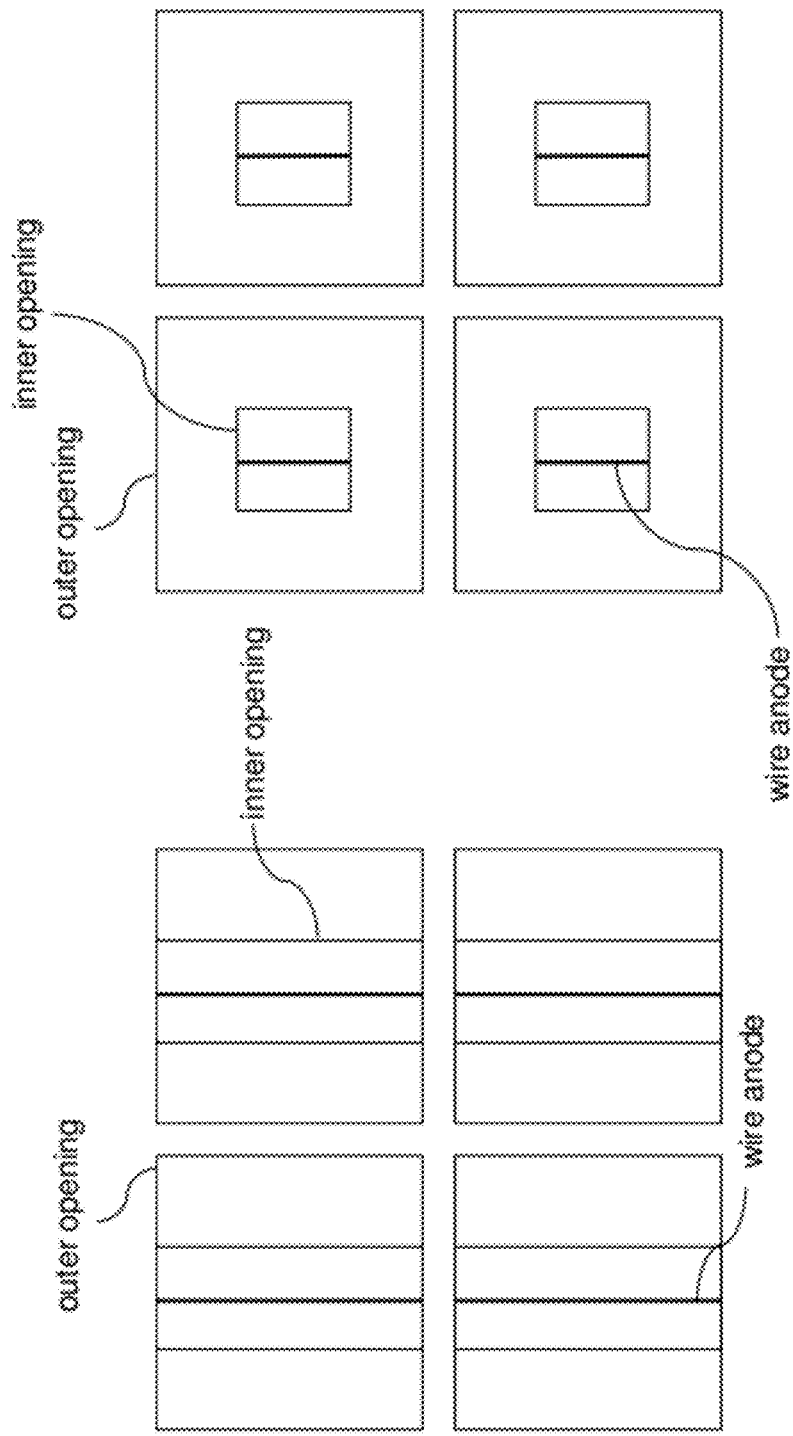

HIGH EFFICIENCY PROPORTIONAL NEUTRON DETECTOR WITH SOLID LINER INTERNAL STRUCTURES

RELATED APPLICATIONS

This application claims the benefit of priority of the U.S. provisional application 61/447,756 filed on Mar. 1, 2011.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in this invention.

FIELD OF THE INVENTION

The present invention relates to neutron detectors, and particularly to neutron detectors employing a coating layer of a neutron-absorbing material, and methods of operating the same.

BACKGROUND OF THE INVENTION

The unambiguous detection and characterization of special nuclear materials (SNM), particularly shielded highly enriched uranium at standoff distances and weapons grade plutonium, is a challenging problem. Recently, that problem has become even more acute due to the worldwide shortage of $^3$He—the neutron converter isotope for the leading SNM neutron detectors.

$^3$He used in industry is manufactured as a product of tritium decay. Tritium can be produced through neutron bombardment of deuterium, lithium, boron, or nitrogen targets. Production of tritium in significant quantities requires the high neutron flux of a nuclear reactor. Current supplies of $^3$He come, in part, from the dismantling of nuclear weapons. Because the need for warhead disassembly is diminishing, tritium is now in short supply. Because current production method for $^3$He employs conversion of tritium, tritium needs to be produced at the same rate as $^3$He, and tritium must generated continually because tritium decays with a half life of about 12.32 years. Because there is not enough facility to generate tritium, the current shortage of $^3$He is expected to continue into the future, and is likely to be exacerbated.

SUMMARY OF THE INVENTION

A tube-style neutron detector, a panel-style neutron detector incorporating a plurality of tube-style neutron detectors, and a panel-style neutron detector including a plurality of anode wires are provided. A plurality of channels is provided in a neutron detector such that each channel has an inner surface of a coating layer including a neutron-absorbing material. A wire anode is provided at end of each channel so that electrons generated by a charged daughter particle generated by a neutron are collected to detect a neutron-matter interaction.

Moderator units can be incorporated into a neutron detector to provide improved detection efficiencies and/or to determine neutron energy spectrum. Gas-based proportional response from the neutron detectors can be employed for special nuclear material (SNM) detection. This neutron detector can provide similar performance to $^3$He-based detectors without requiring $^3$He and without containing toxic, flammable, or high-pressure gases.

The new neutron detectors do not employ $^3$He, and thus, can be fabricated at considerably lower costs than neutron detectors employing $^3$He. Further, other materials of construction for the new neutron detectors are not high cost, and the fabrication process does not involve high-temperature, high-pressure gases. The new neutron detectors can be implemented in a variety of physical configurations and sizes.

A boron-based neutron detector or a lithium-lined neutron detector operates in the proportional region with unique internal structures that provide a large active mass of solid boron or solid lithium within a tube. The internal structures include channels in which an unobstructed pathway is provided for free electrons (from ion-pair generation) to reach a wire anode. A tube-style neutron detector, a panel-style neutron detector, and a multilayer neutron detector are provided.

According to an aspect of the present invention, a neutron detector is provided, which includes: a tubular conductive cathode laterally surrounding a volume therein; a wire anode located within, and along an axial direction of, the tubular conductive cathode; and a frame structure including a plurality of radial channels located between the tubular conductive cathode and the wire anode, wherein each of the plurality of radial channels is laterally surrounded by a coating layer of a neutron-absorbing material.

According to another aspect of the present invention, another neutron detector is provided, which includes: at least one panel including a plurality of channels therethrough, wherein each of the plurality of channels is laterally surrounded by a coating layer of a neutron-absorbing material; at least one cathode located on one side of each of the at least one panel; and an array of substantially parallel wire anodes located on another side of each of the at least one panel.

BRIEF DESCRIPTION OF THE DRAWINGS

FIG. 3A is a side view of portions of a first variation of a frame structure according to the first embodiment of the present disclosure.

FIG. 3D is a side view of portions of a fourth variation of the frame structure according to the first embodiment of the present disclosure.

FIG. 3E is a side view of portions of a fifth variation of the frame structure according to the first embodiment of the present disclosure.

FIG. 6A illustrates an embossed disk, which can be a basic molded or stamped plastic, ceramic, or glass structure.

FIG. 6B illustrates a structure formed by stacking two units of embossed disks, which are assembled to form radial cavities having varying hexagonal cross-sectional areas.

FIG. 7 illustrates an exemplary neutron detector including a plurality of neutron detector units according to the first embodiment of the present disclosure.

FIG. 8D is a side view of portions of a second variation of the frame structure according to the second embodiment of the present disclosure.

FIG. 8E is a side view of portions of a third variation of the frame structure according to the second embodiment of the present disclosure.

FIG. 8F is a side view of portions of a fourth variation of the frame structure according to the second embodiment of the present disclosure.

FIG. 8G is a side view of portions of a fifth variation of the frame structure according to the second embodiment of the present disclosure.

DETAILED DESCRIPTION OF THE INVENTION

Figure 1:
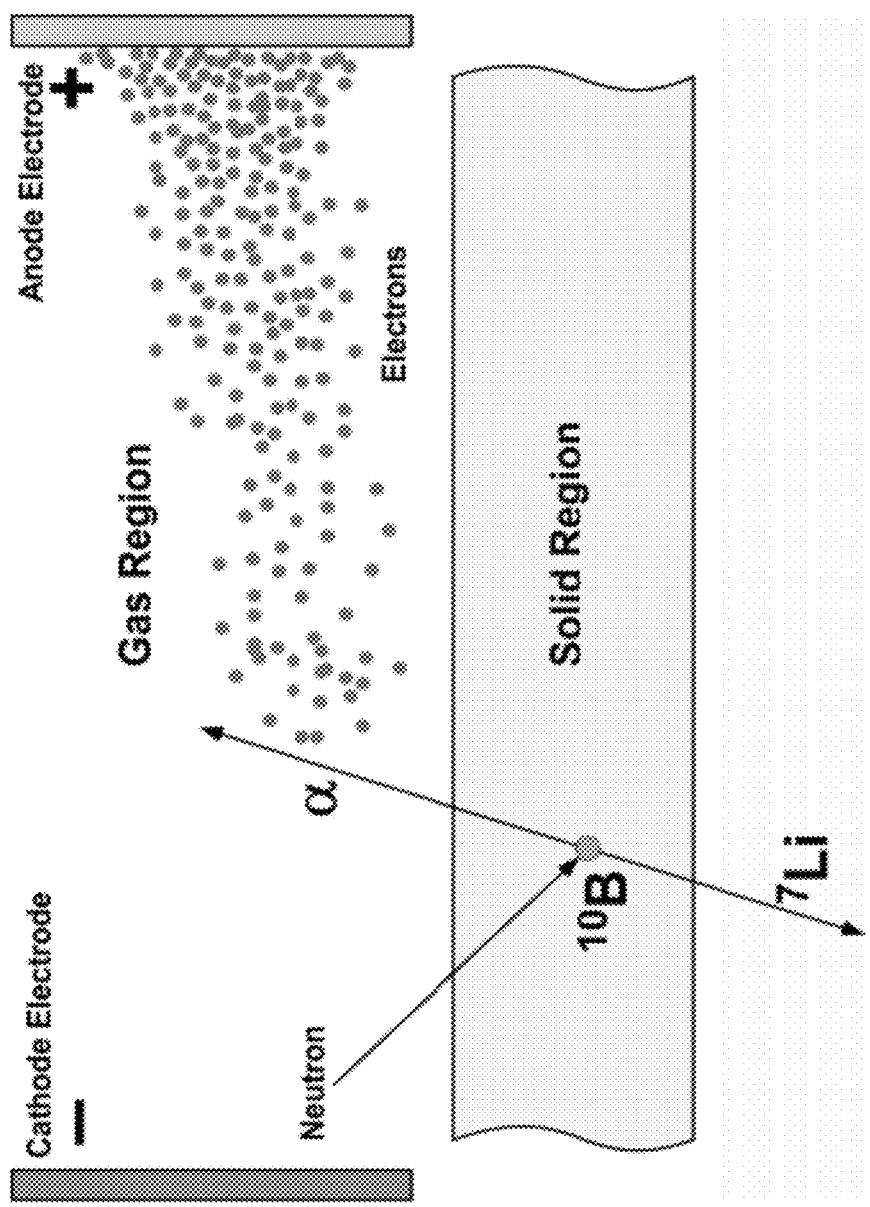
FIG. 1 is a schematic diagram illustrating ionization electrons from energetic particle track with avalanche formation at the high field gradient region of a wire anode electrode.

As stated above, the present invention relates to neutron detectors employing a coating layer of a neutron-absorbing material, and methods of operating the same, which are now described in detail with accompanying figures. It is noted that like and corresponding elements mentioned herein and illustrated in the drawings are referred to by like reference numerals. It is also noted that proportions of various elements in the accompanying figures are not drawn to scale to enable clear illustration of elements having smaller dimensions relative to other elements having larger dimensions.

Referring to FIG. 1, a schematic diagram illustrates ionization electrons from energetic particle track with avalanche formation at the high field gradient region of a wire anode electrode. In this illustrative diagram, neutron capture by $^{10}B$ or $^6Li$ is employed. $^{10}B$ or $^6Li$ reacts with a neutron by producing an energetic $^7Li$ particle as a daughter particle. In the case of $^{10}B$, an $\alpha$ particle is also generated as a daughter particle. A daughter particle can pass through the solid region in which they are born, and then can travel into a gas-filled region, where the daughter particle causes ionization along its track. Electrons and ions separate due to an externally applied electric field. Ions migrate to the cathode, and electrons migrate to the anode. Due to the lighter mass of the electrons relative to the ions, the electrons travel faster than the ions by a factor of about 1,000. A positive direct current (DC) electrical bias is applied to the anode relative to the cathode. The anode is embodied as a fine wire anode that generates a steep electric field gradient in its near vicinity. Ionization electrons from energetic particle track with avalanche formation at the high field gradient region of the wire anode electrode. The electric field gradient causes gas multiplication, which provides inherent signal amplification. Thus, current amplification is performed as in a proportional counter.

Figure 2A:
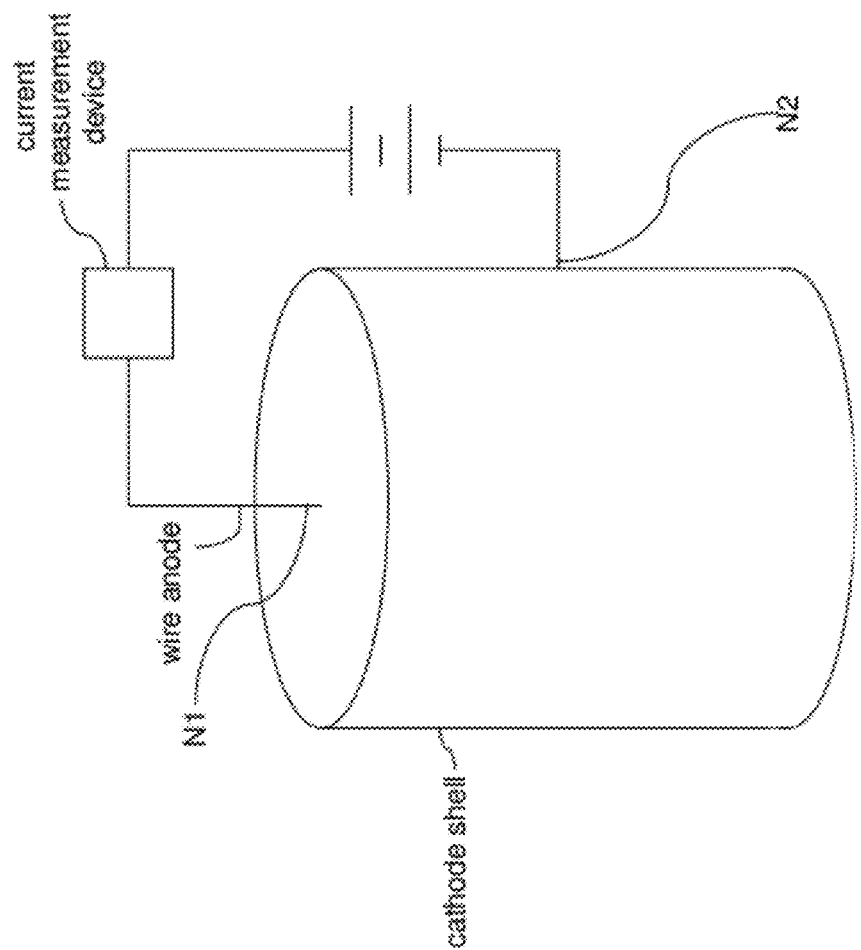
FIG. 2A is a schematic diagram of an exemplary neutron detector including a single neutron detector unit according to a first embodiment of the present disclosure.
Figure 2B:
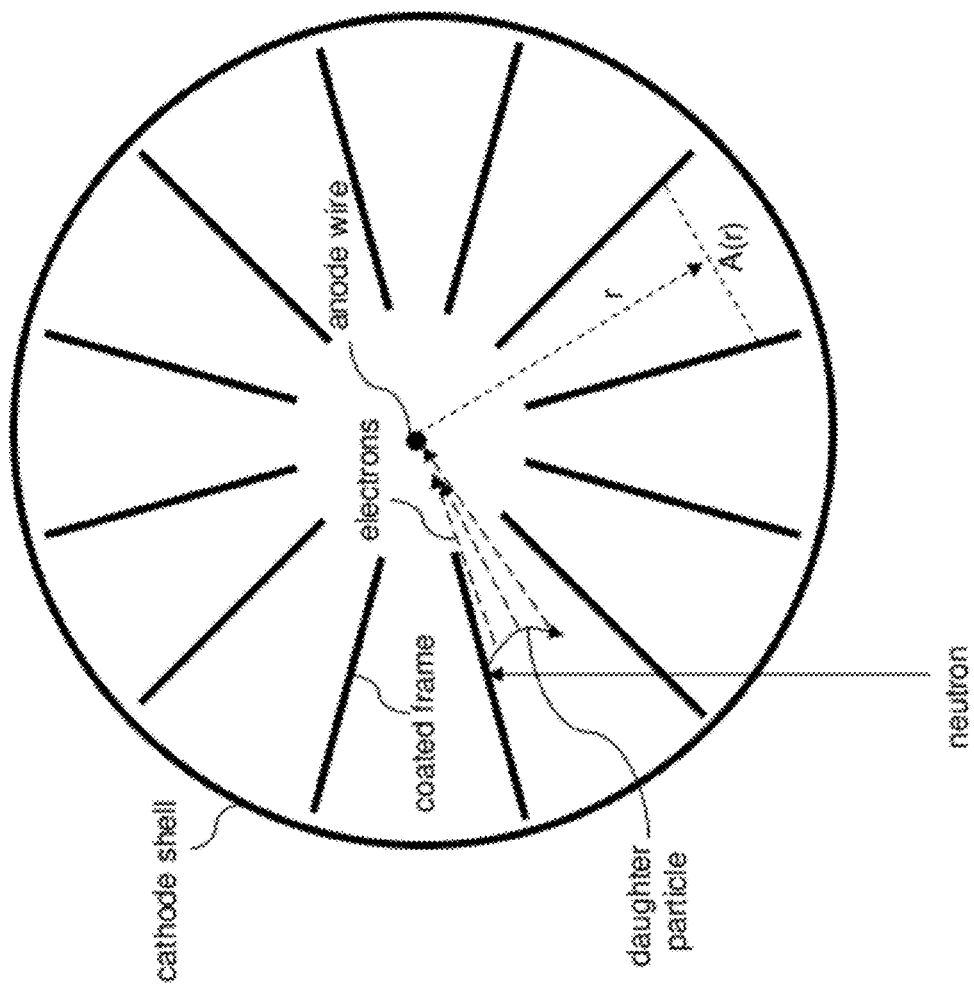
FIG. 2B is a horizontal cross-sectional view of a first exemplary neutron detector unit according to the first embodiment of the present disclosure. Neutron interaction with a neutron-interacting material in the coating layer can produce a daughter particle, such as an α particle, triggering multiple ionizations along its track.
Figure 2C:
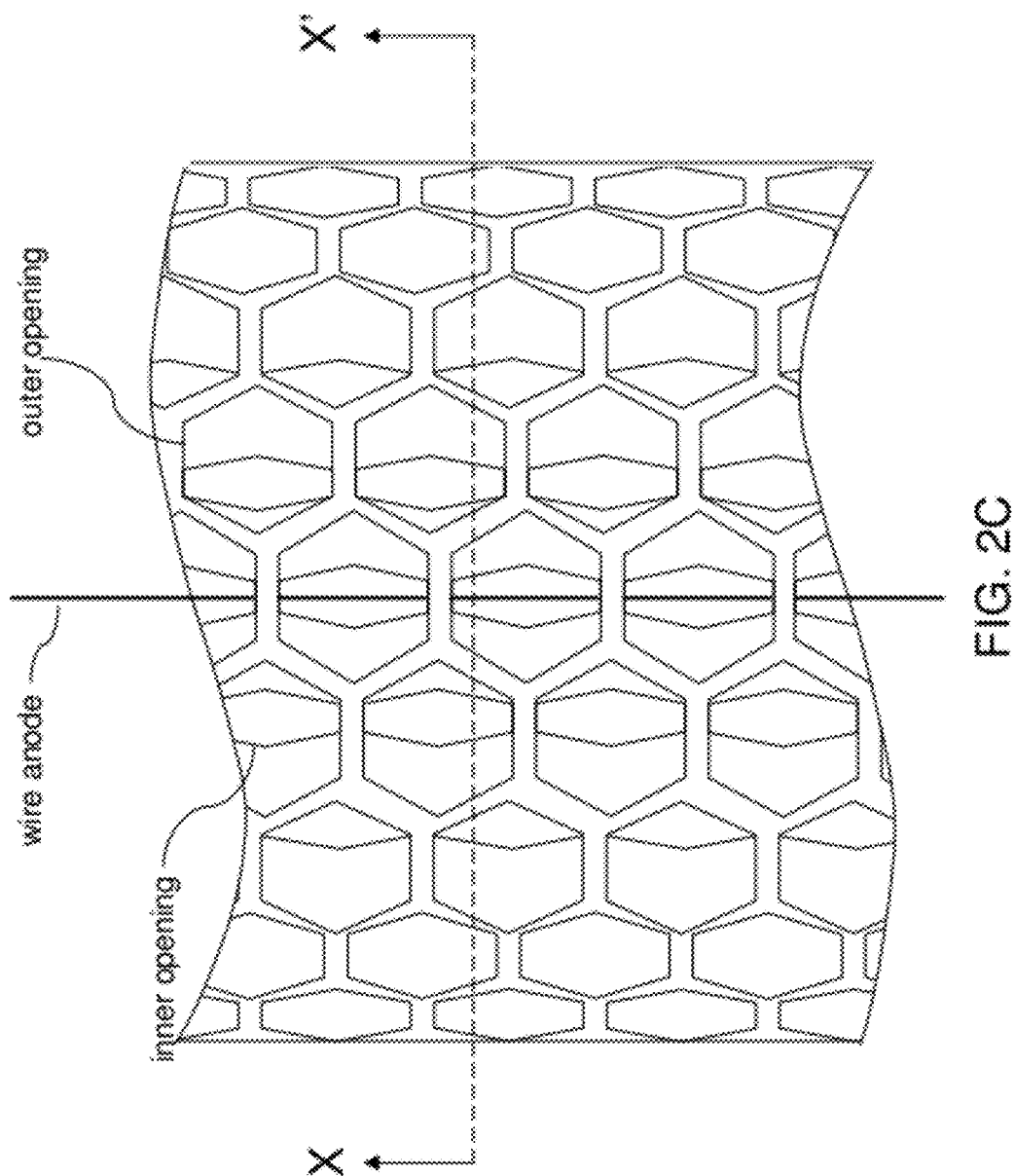
FIG. 2C is a side view of portions of the first exemplary neutron detector unit excluding a cylindrical conductive cathode according to the first embodiment of the present disclosure. An internal hexagonal lattice structure in a frame structure is shown.

Referring to FIGS. 2A, 2B, and 2C, an exemplary neutron detector including a single neutron detector unit is shown according to a first embodiment of the present disclosure. FIG. 2A shows the overall configuration of the exemplary neutron detector, FIG. 2B shows a horizontal cross-sectional area of a first exemplary detector unit, and FIG. 2C shows a side view of the first exemplary detector unit excluding a cylindrical conductive cathode.

The exemplary neutron detector includes a direct current (DC) voltage supply source, which can be a battery, a series connection of batteries, or any electrical circuit configured to provide a stable and constant direct current (DC) voltage bias. The DC voltage supply source is connected across a positive voltage supply node N1 and a negative voltage supply node N2 of the first exemplary detector unit. The positive voltage supply node N1 can be a portion of a wire anode that protrudes from an enclosure of the first exemplary detector unit, and the negative voltage supply node N2 can be a contact region with the cathode shell of the first exemplary detector unit. In one embodiment, the cathode shell can be a portion of an air-tight or vacuum-tight enclosure that defines the outer boundary of the first exemplary detector unit. A current measurement device connected in series with the direct current voltage supply source between the positive voltage supply node N1 and the negative voltage supply node N2. In one embodiment, the magnitude of the DC bias voltage can be from 100 V to 10,000 V, although lesser and greater voltages can also be employed.

The first exemplary neutron detector unit includes a tubular conductive cathode, a wire anode, and a frame structure. The tubular conductive cathode laterally surrounds a volume therein, and can be a contiguous conductive sheet without an opening therein. The wire anode is located within the tubular conductive cathode, and is located along the axial direction of the tubular conductive cathode. The wire anode is electrically insulated from the tubular conductive cathode.

The tubular conductive cathode can have a substantially same horizontal cross-sectional area irrespective of the distance along the axial direction of the tubular conductive cathode. The shape of the horizontal cross-sectional area of the tubular conductive cathode can be circular, elliptical, polygonal, or can have a general curvilinear closed shape. In one embodiment, the tubular conductive cathode has a horizontal cross-sectional shape of an ellipse or a polygon.

The end surfaces of the tubular conductive cathode can be substantially planar, and can include a dielectric material. A set of structures that enclose the volume of the first exemplary detector unit include the tubular conductive cathode, a pair of dielectric end surface portions with an opening for letting the wire anode or a thicker conductive piece connected to the wire anode, and the wire anode or the conductive piece connected to the wire electrode. In this case, the tubular conductive cathode is a portion of an air-tight enclosure in which the frame structure and a portion of the wire anode are enclosed. As used herein, an element is "air-tight" if the element can hold the air therein with less than 1.0% loss per month. As used herein, an element is "vacuum-tight" if the element can hold the vacuum therein with less than 1.0% change in base pressure per month.

In one embodiment, the tubular conductive cathode can have a circular horizontal cross-sectional area. In a non-limiting example, the diameter of the tubular conductive cathode can be from 0.25 cm to 30 cm, although lesser and greater diameters can also be employed. In one embodiment, the tubular conductive cathode can have a diameter from 25 mm to 50 mm and a length from 300 mm to 600 mm, although lesser and greater diameters and/or lesser or greater lengths can also be employed.

The wire anode can be a circular conductive wire having a diameter from 5 microns to 100 microns. It is preferred that the diameter of the wire anode be minimized as long as the wire anode can remain mechanically stable without breakage. The material of the wire anode can be an electrically conductive carbon fiber, a conductive metallic material such as tungsten, copper, aluminum, or any combination thereof.

The frame structure includes a plurality of radial channels located between the tubular conductive cathode and the wire anode. Each of the plurality of radial channels is laterally surrounded by a coating layer of a neutron-absorbing material. The neutron-absorbing material includes at least one of a boron-containing material and a lithium-containing material.

In one embodiment, the neutron-absorbing material is a boron-containing material that includes boron at an atomic concentration greater than 5%. In another embodiment, the boron-containing material can include boron at an atomic concentration greater than 20%. In even another embodiment, the boron-containing material can include boron at an atomic concentration greater than 30%. In yet another embodiment, the boron-containing material can include boron at an atomic concentration greater than 40%. In still another embodiment, the neutron-absorbing material is a carborane or a derivative of a carborane. In still another embodiment, the boron-containing material can include boron at an atomic concentration about, or greater than, 41.6% as in the case of carboranes. In a further embodiment, the neutron-absorbing material is a lithium-containing material that includes lithium at an atomic concentration greater than 5%. In a further another embodiment, the boron-containing material can include boron at an atomic concentration greater than 20%. In yet further another embodiment, the lithium-containing material can include lithium at an atomic concentration greater than 30%. In even further another embodiment, the lithium-containing material can include lithium at an atomic concentration greater than 40%. The coating layer 420 can be formed, for example, by painting, spraying, spin-coating, or any other deposition method that forms a solid layer from a liquid, a gas, an aerosol, or any other precursor material containing the neutron absorbing material of the embodiments of the present disclosure.

The frame structure can include at least one substrate structure on which the coating layer is coated. In one embodiment, the substrate structure(s) can include a plastic material, a ceramic material, or glass. In one embodiment, the frame structure can include biaxially-oriented polyethylene terephthalate (BoFET)(of which a commercially available example is Mylar ™), which is a plastic material that provides a low outgassing rate compared to other plastic materials. Additional materials that can be employed for the frame structure include, but are not limited to, polytetrafluoroethylene (PTFE), polychlorotrifluoroethylene (PCTFE), polyphenylene sulphide (PPS), polyetheretherketone (PEEK), polyethylene, polyimide, and poly(4,4'-oxydiphenylene-pyromellitimide) (of which a commercially available example is Kapton™ developed by DuPont™). For plastics that have outgassing characteristics, a coating of the neutron-absorbing material acts as a sealant that impedes release of electronegatives to the detector gas that fills inside of the neutron detector unit.

The substrate structure(s) can be cut, stamped, and/or molded to provide the general shapes of the frame structure. The substrate structure includes a material that is not conductive.

In one embodiment, the substrate structure can have a resistivity in a range from $1.0 \times 10^7$ Ω-cm to $1.0 \times 10^{14}$ Ω-cm. In another embodiment, the substrate structure can have a resistivity greater than $1.0 \times 10^8$ Ω-cm. In even another embodiment, the substrate structure can have a resistivity greater than $1.0 \times 10^9$ Ω-cm. In yet another embodiment, the substrate structure can have a resistivity greater than $1.0 \times 10^{10}$ Ω-cm. In even another embodiment, the substrate structure can have a resistivity greater than $1.0 \times 10^{11}$ Ω-cm. In still another embodiment, the substrate structure can have a resistivity greater than $1.0 \times 10^{12}$ Ω-cm. In still yet another embodiment, the substrate structure can have a resistivity greater than $1.0 \times 10^{13}$ Ω-cm. In a further embodiment, the substrate structure can have a resistivity less than $1.0 \times 10^{13}$ Ω-cm. In an even further embodiment, the substrate structure can have a resistivity less than $1.0 \times 10^{12}$ Ω-cm. In a yet further embodiment, the substrate structure can have a resistivity less than $1.0 \times 10^{11}$ Ω-cm. In an even further embodiment, the substrate structure can have a resistivity less than $1.0 \times 10^{10}$ Ω-cm. In a still further embodiment, the substrate structure can have a resistivity less than $1.0 \times 10^9$ Ω-cm. In a still yet further embodiment, the substrate structure can have a resistivity less than $1.0 \times 10^8$ Ω-cm.

The frame structure can have various configurations. Correspondingly, the plurality of radial channels can have various configurations. As illustrated in FIG. 2B, each of the plurality of radial channels has a radial cross-sectional area A(r) that increases with a radial distance r from the wire anode. As used herein, the radial distance r is measured from the center axis of the wire anode in a direction perpendicular to the lengthwise direction of the wire anode.

In one embodiment, the radial cross-sectional area can be a polygonal cross-sectional area. In one embodiment, the polygonal cross-sectional area can have a polygonal cross-sectional shape that has a constant vertical dimension along a direction of the wire anode irrespective of the radial distance from the wire anode, and can have a varying lateral dimension in a direction perpendicular to the wire anode that increases with the radial distance from the wire anode. For example, the polygonal cross-sectional area can have a hexagonal cross-sectional shape that has a constant vertical dimension along a direction of the wire anode irrespective of the radial distance from the wire anode, and can have a varying lateral dimension in a direction perpendicular to the wire anode that increases with the radial distance from the wire anode.

Neutron interaction with a neutron-interacting material in the coating layer can produce a daughter particle. For example, a neutron interaction with $^{10}$B in the coating layer causes an energetic α particle to emerge, which triggers multiple ionizations along its track. The resulting electrons are attracted to the anode due to bias potential. A high field gradient in the near vicinity of the fine wire anode causes avalanche formation with resulting proportional counter signal generation. Typically, the avalanche is confined to a region only several times the wire diameter.

A gas-type proportional neutron detector according to embodiments of the present disclosure employs multiple solid layers of $^{10}$B or $^6$Li as the neutron converter isotope with preferable energy deposition kinetics. This neutron detector does not employ $^3$He, and therefore, manufacture and use of this neutron detector is not limited by the current worldwide shortage of $^3$He.

Boron or lithium is present within a thin solid coating layer on a complex plastic internal structure provided by the plurality of channels. The increased surface area of the coating layer due the presence of the plurality of channels provides a large mass of solid boron compound or a solid lithium compound for neutron capture. Plastic materials employed in the at least one substrate structure preserves the radial electric field lines. The absence of any conductive material between the tubular conductive cathode and the wire anode provides a radial electrical field. The electrons generated within the first exemplary neutron detector unit travels in the opposite direction of the radial electric field toward the wire anode at the center, and causes avalanche amplification in the vicinity of the wire anode.

The exemplary neutron detector of the present disclosure employs non-toxic, non-flammable, and low-cost materials of construction. $^{10}$B is a neutron converter isotope with energetic charged daughter particles. All known boron gaseous boron compounds are highly toxic and thus considered unsuitable for widespread deployment. Because $^{10}$B can be incorporated as a solid material in the coating layer, the toxicity of the gaseous boron compounds does not cause health or environmental problems in the first exemplary neutron detector unit of the present disclosure. The fill gas can be the commonly used P-10 mixture, which includes 90% Ar and 10% methane.

The exemplary neutron detector of the present disclosure can be employed as a passive neutron detector for a range of nonproliferation applications involving special nuclear material (SNM) detection by providing a new detector design that can be manufactured without $^3$He supply limitations. The exemplary neutron detector of the present disclosure is applicable to both fixed and mobile ground, maritime, and space-based applications. Detection efficiency of the exemplary neutron detector of the present disclosure can be comparable with the detection efficiency of $^3$He tubes for thermal neutrons, while the exemplary neutron detector of the present disclosure can provide a lower gamma response than $^3$He tubes.

Referring to FIG. 3A, a first variation of the frame structure is illustrated. In the first variation, the radial channels can have a polygonal cross-sectional area. The polygonal cross-sectional area can have a polygonal cross-sectional shape that changes dimensions of sides in proportion to the radial distance from the wire anode. For example, the polygonal cross-sectional area can have a hexagonal cross-sectional shape that changes dimensions of sides in proportion to the radial distance from the wire anode. In one embodiment, the hexagonal cross-sectional shape can be a regular hexagonal cross-sectional shape.

Figure 3C:
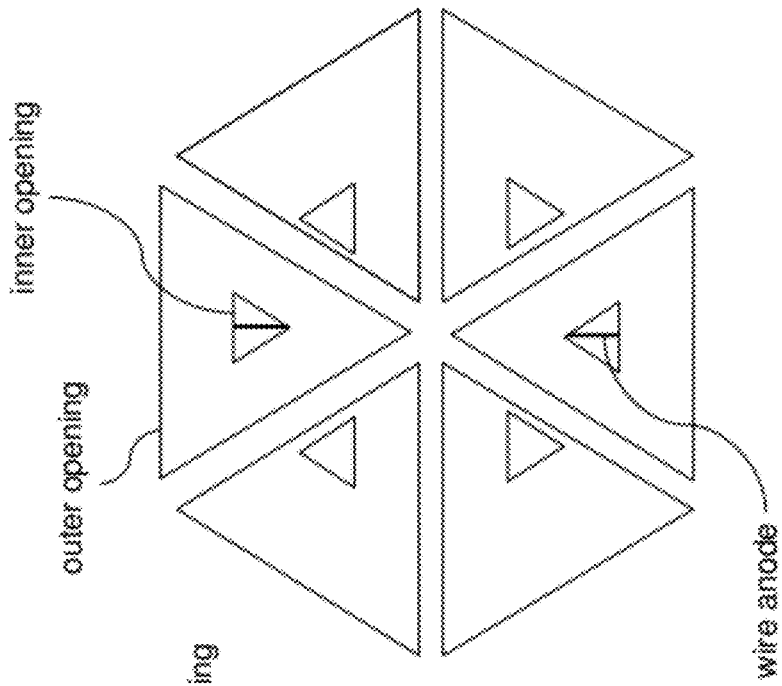
FIG. 3C is a side view of portions of a third variation of the frame structure according to the first embodiment of the present disclosure.
Figure 3B:
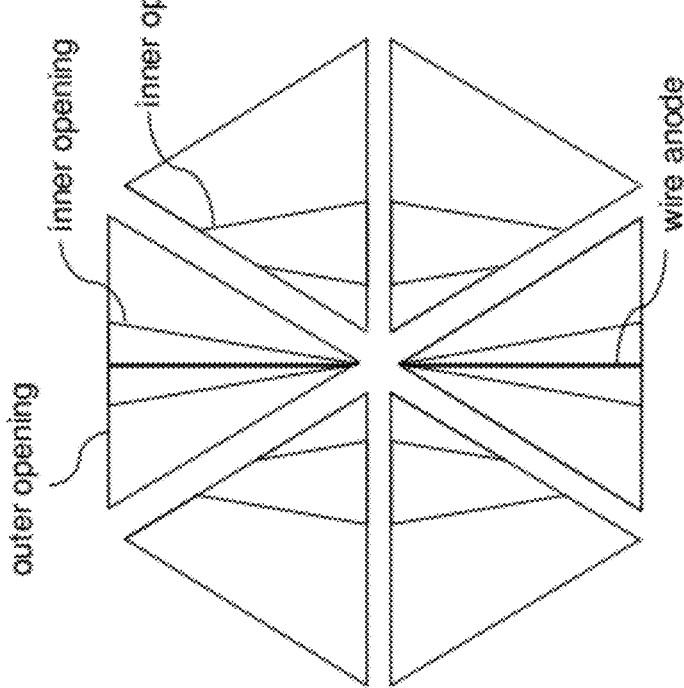
FIG. 3B is a side view of portions of a second variation of the frame structure according to the first embodiment of the present disclosure.

Referring to FIG. 3B, a second variation of the frame structure is illustrated. In the second variation, the radial channels can have a polygonal cross-sectional area. The polygonal cross-sectional area can have a polygonal cross-sectional shape that has a constant vertical dimension along a direction of the wire anode irrespective of the radial distance from the wire anode, and can have a varying lateral dimension in a direction perpendicular to the wire anode that increases with the radial distance from the wire anode. For example, the polygonal cross-sectional area can have a triangular cross-sectional shape that has a constant vertical dimension along a direction of the wire anode irrespective of the radial distance from the wire anode, and has a varying lateral dimension in a direction perpendicular to the wire anode that increases with the radial distance from the wire anode.

Referring to FIG. 3C, a third variation of the frame structure is illustrated. In the third variation, the radial channels can have a polygonal cross-sectional area. The polygonal cross-sectional area can have a polygonal cross-sectional shape that changes dimensions of sides in proportion to the radial distance from the wire anode. For example, the polygonal cross-sectional area can have a triangular cross-sectional shape that changes dimensions of sides in proportion to the radial distance from the wire anode. In one embodiment, the triangular cross-sectional shape can be a regular hexagonal cross-sectional shape.

Referring to FIG. 3D, a fourth variation of the frame structure is illustrated. In the second variation, the radial channels can have a polygonal cross-sectional area. The polygonal cross-sectional area can have a polygonal cross-sectional shape that has a constant vertical dimension along a direction of the wire anode irrespective of the radial distance from the wire anode, and can have a varying lateral dimension in a direction perpendicular to the wire anode that increases with the radial distance from the wire anode. For example, the polygonal cross-sectional area can have a rectangular cross-sectional shape that has a constant vertical dimension along a direction of the wire anode irrespective of the radial distance from the wire anode, and has a varying lateral dimension in a direction perpendicular to the wire anode that increases with the radial distance from the wire anode.

Referring to FIG. 3E, a fifth variation of the frame structure is illustrated. In the third variation, the radial channels can have a polygonal cross-sectional area. The polygonal cross-sectional area can have a polygonal cross-sectional shape that changes dimensions of sides in proportion to the radial distance from the wire anode. For example, the polygonal cross-sectional area can have a rectangular cross-sectional shape that changes dimensions of sides in proportion to the radial distance from the wire anode.

Figure 3G:
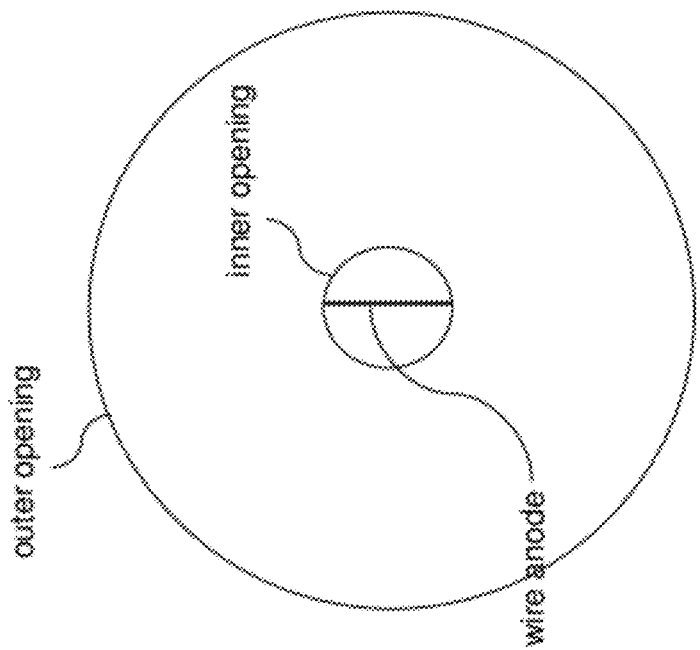
FIG. 3G is a side view of portions of a seventh variation of the frame structure according to the first embodiment of the present disclosure.
Figure 3F:
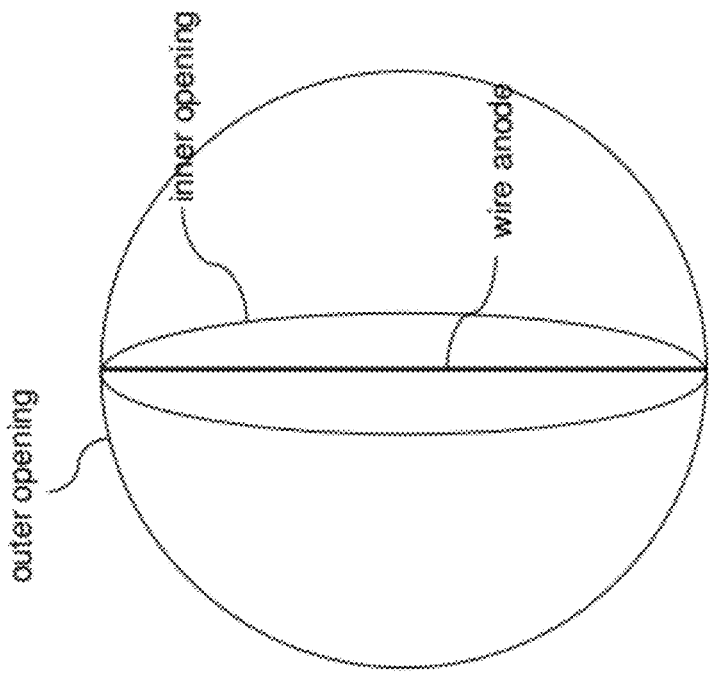
FIG. 3F is a side view of portions of a sixth variation of the frame structure according to the first embodiment of the present disclosure.

Referring to FIG. 3F, a sixth variation of the frame structure is illustrated. In the sixth variation, the radial channels can have an elliptical cross-sectional area. The elliptical cross-sectional area can have an elliptical cross-sectional shape that has a constant vertical dimension along a direction of the wire anode irrespective of the radial distance from the wire anode, and can have a varying lateral dimension in a direction perpendicular to the wire anode that increases with the radial distance from the wire anode. For example, the elliptical cross-sectional area can have an elliptical cross-sectional shape that has a constant vertical dimension along a direction of the wire anode irrespective of the radial distance from the wire anode, and has a varying lateral dimension in a direction perpendicular to the wire anode that increases with the radial distance from the wire anode. In one embodiment, the shape of the outer opening, i.e., the opening toward the tubular conductive cathode, of each radial channel can be a circle, and the shape of the inner opening, i.e., the opening toward the wire anode, of each radial channel can be an ellipse.

Referring to FIG. 3G, a seventh variation of the frame structure is illustrated. In the seventh variation, the radial channels can have an elliptical cross-sectional area. The elliptical cross-sectional area can have an elliptical cross-sectional shape that changes dimensions in proportion to the radial distance from the wire anode while maintaining the same ellipticity. For example, the elliptical cross-sectional area can have an elliptical cross-sectional shape that changes dimensions in proportion to the radial distance from the wire anode while maintaining the same ellipticity. In one embodiment, the elliptical cross-sectional shape can be a circular cross-sectional shape, i.e., can have an ellipticity of zero.

In each of the configurations illustrated in FIGS. 2A-2C and 3A-3G, a portion of the wire anode can be in a line-of-sight from each point within each radial channel. In one embodiment, an inner surface of the tubular conductive cathode can be in another line-of-sight from each point within the radial channel. The presence of the wire anode in a line-of-sight from each point within each radial channel provides unimpeded, unblocked acceleration of electrons generated at any point within a radial channel toward the wire anode, thereby enhancing the efficiency of neutron detection.

Figure 4:
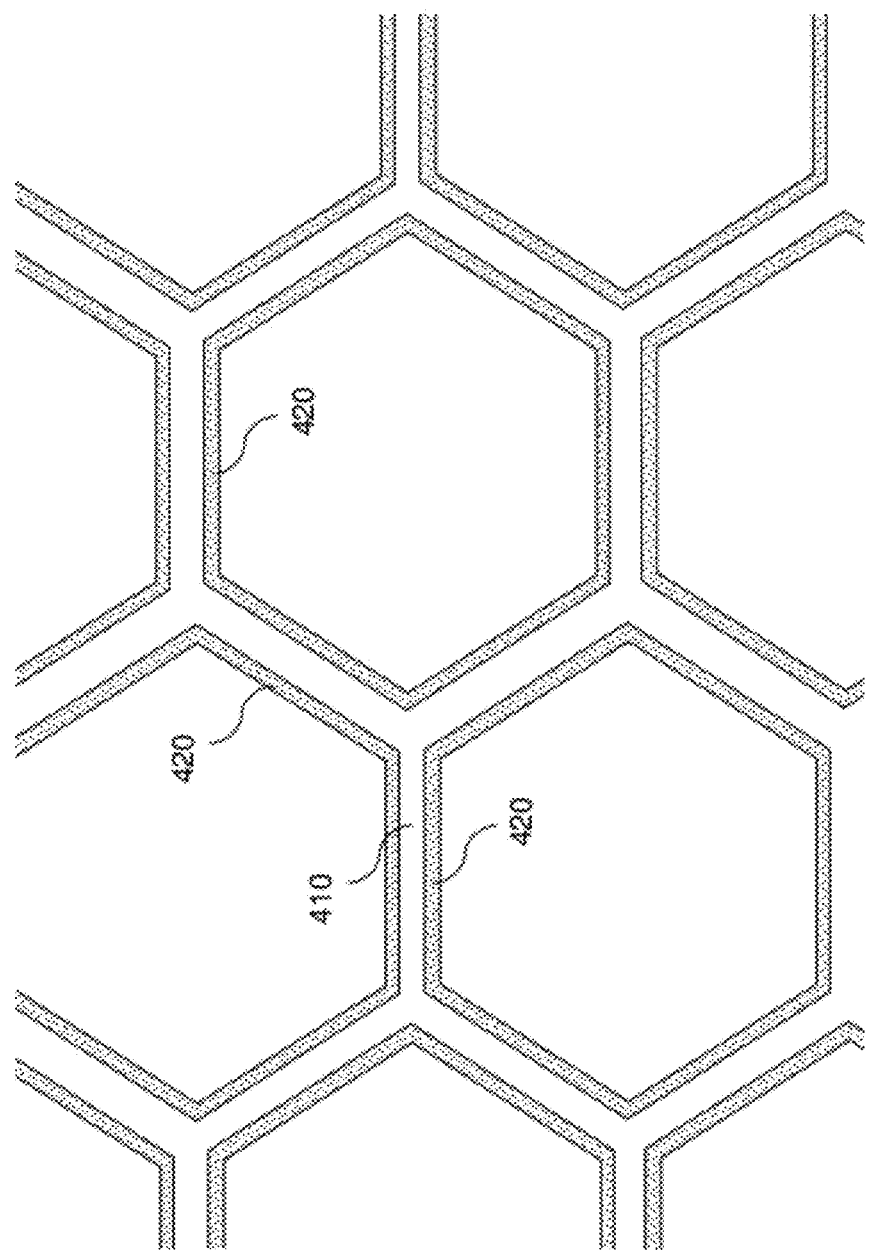
FIG. 4 illustrates a coating layer located on inner surfaces of a portion of a frame structure.

Referring to FIG. 4, a coating layer 420 located on inner surfaces of a portion of a frame structure is illustrated. The frame structure includes at least one substrate structure 410, which defines the geometry of the radial channels and provides mechanical support to the coating layer 420. The coating layer 420 is a solid coating layer, and can have a thickness from 10 nm to 2,000 nm. In one embodiment, the thickness of the coating layer 420 can be greater than 20 nm. In yet another embodiment, the thickness of the coating layer 420 can be greater than 50 nm. In even another embodiment, the thickness of the coating layer 420 can be greater than 100 nm. In still another embodiment, the thickness of the coating layer 420 can be greater than 200 nm. In still yet another embodiment, the thickness of the coating layer 420 can be greater than 500 nm. In a further embodiment, the thickness of the coating layer 420 can be less than 500 nm. In a yet further embodiment, the thickness of the coating layer 420 can be less than 200 nm. In an even further embodiment, the thickness of the coating layer 420 can be less than 100 nm. In a still further embodiment, the thickness of the coating layer 420 can be less than 50 nm.

In one embodiment, a plastic substrate can be employed for the at least one substrate structure. In this case, the first exemplary neutron detector unit can be formed employing a plastic substrate having an inner coating of a boron-containing material or a lithium-containing material for the frame structure to give the desired neutron response. The first exemplary neutron detector unit can include an outer tube that is the same as, or include, the tubular cathode electrode, the frame structure that can be implemented as an inner honeycomb-like structure, and a coating of a boron-containing material or a lithium-containing material on the honeycomb and optionally, on the interior surface of the tubular cathode electrode, a fill gas such as argon at atmospheric pressure (optionally with a quench gas), the wire anode, and end caps with insulated pass-throughs for extending the wire anode through or for connecting to the wire anode.

Each substrate structure has as its only purpose to support the coating layer of the boron-containing material or the lithium-containing material. As illustrated in FIG. 4, the inner surface of a substrate structure 410 is coated with a coating layer 420, which includes a boron-containing material or a lithium-containing material. The thickness of the coating layer 420 is selected in order to provide a thickness allowing a high probability that energetic daughter particle(s) would escape to the gas. The thickness may be less than a micron depending on particle range. The substrate structure 410 may be as much as a millimeter thick so that doping the substrate structure 410 with boron or lithium would only serve to reduce neutron detection efficiency. Thus, the substrate structure 410 is not doped with boron or lithium.

Optionally and preferably, another coating layer can be located on an inner surface of the tubular conductive cathode. This coating layer can include the same neutron-absorbing material as the coating layer 420, or another neutron-absorbing material that is different from the neutron-absorbing material of the coating layer 420.

Figure 5:
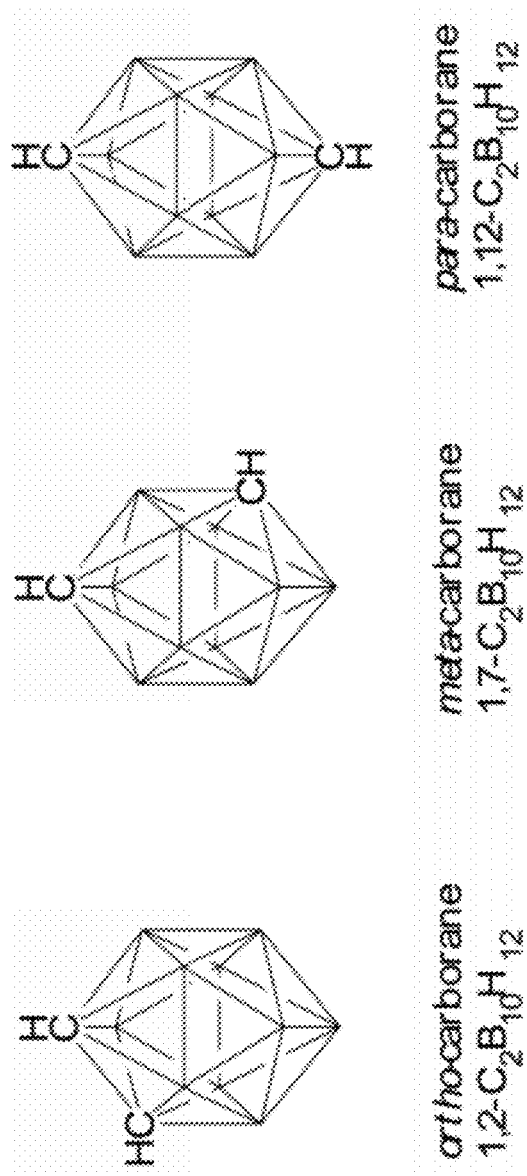
FIG. 5 illustrates structures of carborane isomers. Each unmarked vertex of a dodecahedron represents a BH group.

Carboranes ($C_2B_{10}H_{12}$) can be employed as a boron-containing material in the coating layer 420. Carboranes are robust high boron content molecules having a dodecahedral structure with well-developed organic chemistry. Carboranes can be used to coat the surfaces of the internal structures with boron. There are three isomers of carborane differing in the relative positions of the two carbon atoms. The 1,2-carborane and 1,7-carborane isomers illustrated in FIG. 5 are the most useful for attaching to plastic surfaces. Each unmarked vertex of a dodecahedron represents a BH group. These boron containing compounds can be incorporated into organic polymers or into siloxane compounds for attachment to surfaces. The coating layer 420 (See FIG. 4) can be formed, for example, by painting, spraying, spin-coating, direct chemical reaction of a carborane containing precursor, or any other deposition method that forms a solid layer from a liquid, a gas, an aerosol, or any other precursor material containing the neutron absorbing material of the embodiments of the present disclosure.

The frame structure of the first exemplary detector unit or the variations thereof can be formed by stacking embossed disks. As used herein, an "embossed" structure is a structure having a non-planar local protrusion or a non-planar local recess.

Figure 6C:
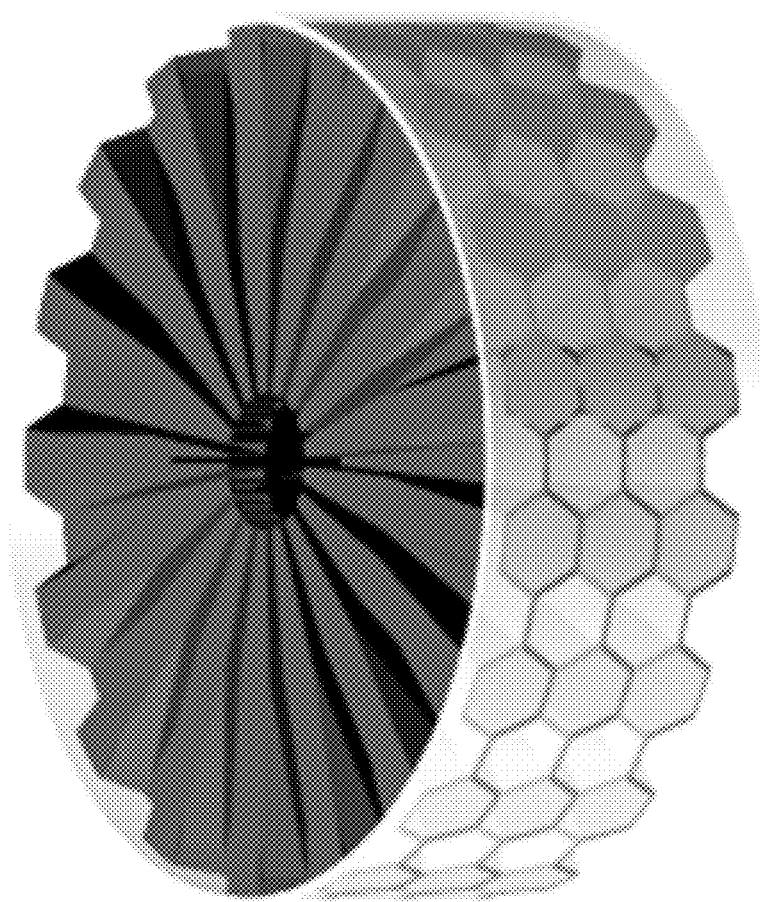
FIG. 6C illustrates a frame structure formed by assembly of multiple units of embossed disks in a manner to form a hexagonal array pattern with outside sidewall surfaces.

For example, FIGS. 6A-6C illustrate a sequence of forming a frame structure by employing a plurality of embossed disks, each of which is a substrate structure. The embossed disk illustrated in FIG. 6A can be a basic molded or stamped plastic, ceramic, or glass structure.

The structure illustrated in FIG. 6B is formed by stacking two units of embossed disks. The embossed disks can have various profiles provided that the embossed disks can be assembled to form radial channels, i.e., radial cavities, having radially-increasing cross-sectional areas and provide a line-of-sight view of a portion of the wire anode to each point within the radial channels. In one embodiment, the radial channels can have varying hexagonal cross-sectional areas, i.e., radially-increasing hexagonal cross-sectional areas, as illustrated in FIG. 6B.

Referring to FIG. 6C, a frame structure can be formed by assembly of multiple units of stacked embossed disks. In one embodiment, a hexagonal array pattern can be formed with outside sidewall surfaces. A plurality of radial channels is formed within the assembly of multiple units of embossed disks. Each of the plurality of radial channels is bounded by an embossed portion of an upper stacked embossed disk and an embossed portion of a lower stacked embossed disk in contact with the upper stacked embossed disk.

Each of the plurality of stacked embossed disks includes a substrate structure 410 (See FIG. 4) on which the coating layer 420 (See FIG. 4) is coated. An anode wire is placed at the center axis of the plurality of stacked embossed disks.

In one embodiment, the outer peripheral surfaces of the plurality of stacked embossed disks can have a circular shape in a view along the axial direction, i.e., along the lengthwise direction of the anode wire. Each radial channel can extend outward to the outer peripheral surfaces of the plurality of stacked embossed disks. In this case, the plurality of stacked embossed disks has outer peripheral surfaces located at a same distance from the anode wire as the outermost portions of the plurality of radial channels. In one embodiment, the outer peripheral surfaces of the plurality of stacked embossed disks are spaced from the tubular conductive cathode by a substantially same distance. Additionally or alternately, the outer peripheral surfaces of the plurality of stacked embossed disks can have a honeycomb pattern.

A unit of an embossed disk can be manufactured employing one of many manufacturing methods. One method is hot stamping a plastic material into the shape of an embossed disk or a shape illustrated in FIGS. 2B and 2C, 3A, 3B, 3C, 3D, 3E, 3F, or 3G. Another method is injection molding into the shape of an embossed disk or a shape illustrated in FIGS. 2B and 2C, 3A, 3B, 3C, 3D, 3E, 3F, or 3G. In a non-limiting example, the size of a manufactured frame structure may be 2 cm to 5 cm in diameter (for a tube having a diameter between 1" to 2" tube), and the frame structure can have hexagonal openings with a maximum dimension from 0.5 to 1 cm across each hexagon. A cylindrical neutron detector unit can be fabricated by coating the surfaces of the frame structure, and affixing an anode wire and a tubular conductive cathode in the shape of a cylindrical tube.

Comparison of the effective areas for boron to be deposited shows that for the stacked ribbed surface of FIG. 6C, there is an advantage of 12 times the surface area. Calculation was based on comparing stacked disks with a periodicity of 17 cycles around the circumference and a diameter of 2 inches with the internal area of a circular tube. The ratio of area per tube length (cm) is 192 for the stacked disks of FIG. 6C, while ratio of area per tube length is 15.7 for a tube that does not include stacked disks.

Referring to FIG. 7, a plurality of cylindrical neutron detector units can be connected in parallel and packaged within a panel. The panel including the plurality of cylindrical neutron detectors units can replace the single tube neutron detector unit of FIG. 2A, and can be connected to a DC voltage supply source and a current measurement device to form a panel-type neutron detector. Each cylindrical neutron detector unit includes a tubular conductive cathode, a wire anode, and a frame structure. The panel-type neutron detector includes a plurality of cylindrical neutron detector units. Each wire anode among the plurality of cylindrical neutron detector units is electrically connected to a positive voltage supply node of the DC voltage supply source, and each tubular conductive cathode is electrically connected to a negative voltage supply node of the DC voltage supply source.

In one embodiment, the neutron detector fabricated as a panel device can improve efficiency by dispersing the plurality of cylindrical neutron detector units in a moderator material. As used herein, a moderator material includes any material that slows down a neutron and does not have a significant neutron absorption cross-sectional area, i.e., does not absorb neutrons for practical purposes. In this case, a moderator unit including the moderator material can be located on an outside of, or in a vicinity of, the tubular conductive cathodes.

During operation of a neutron detector employing a single tube neutron detector unit of FIG. 2A or panel-type neutron detector unit of FIG. 7, a direct current (DC) voltage bias is applied across the wire anode and the tubular conductive cathode. Neutrons can be detected by measuring current pulses that flow through a circuit of the neutron detector.

The method of enhancing the overall coating area in a neutron detector unit by employing channels is herein referred to as multi-surface geometry (MSG) technology. For practical applications and widespread field deployment, acquisition and operational costs of a detector system based on the MSG technology can be low due to the ability to mass-produce detectors using automated high-speed manufacturing methods adapted from known industrial manufacturing processes. Maintenance requirements will also be extremely low, and MSG-based detectors can meet, or in many cases exceed, relevant standards such as ANSI N42.35. Further, due to the very high adaptability in internal detector configuration (i.e. location and quantity of sensor elements and neutron moderator), such detectors can be designed to provide information on the energy spectrum of a neutron source.

Neutron detectors employing the MSG technology can be employed for nonproliferation Uses. The many strengths and versatility of the MSG boron-coated proportional neutron detector technology make it suitable for almost any nonproliferation application that uses neutron detection. Examples include monitoring of stored special nuclear material (SNM) such as plutonium; ubiquitous wireless sensor networks; surreptitious wireless sensor networks (e.g. drop from the air into a suspect zone or likely transit area, include a satellite uplink); perimeter and border control systems; handheld detectors for on-demand building, personnel, vehicle, and baggage searches; vehicle and space-based detectors; unmanned remote sensing; maritime applications (e.g. cargo ship scanning); applications requiring low detectability (e.g. camouflaged or buried); applications requiring high resistance to shock, vibration, and other factors; and integration with other detector systems such as gamma spectrum.

The MSG technology may also be used in active interrogation systems for enhanced sensitivity to SNM, particularly uranium, as it can generate the necessary time stamps for neutron detection events. It may be used in new designs or retrofitted to existing installed systems.

If both neutron and gamma detection are required independently in an application (i.e. neutron and gamma counts are differentiated), a gamma detector can be used in conjunction with an MSG neutron detector. For example, cadmium zinc telluride (CZT) could provide low energy gamma spectroscopy to a small wireless sensor for $^{235}$U sensitivity.

Figure 8A:
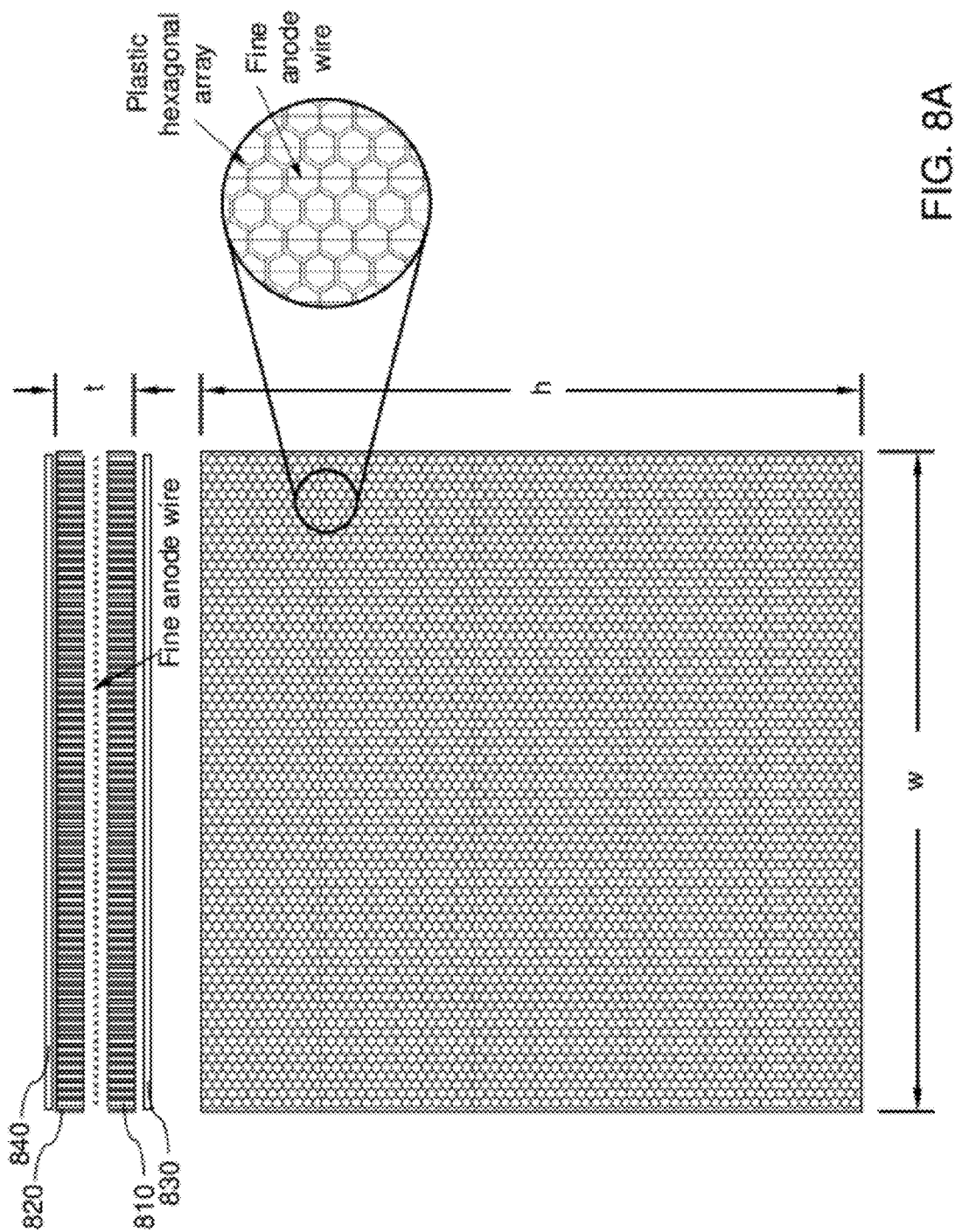
FIG. 8A illustrates various views of an exemplary neutron detector unit according to a second embodiment of the present disclosure.
Figure 8B:
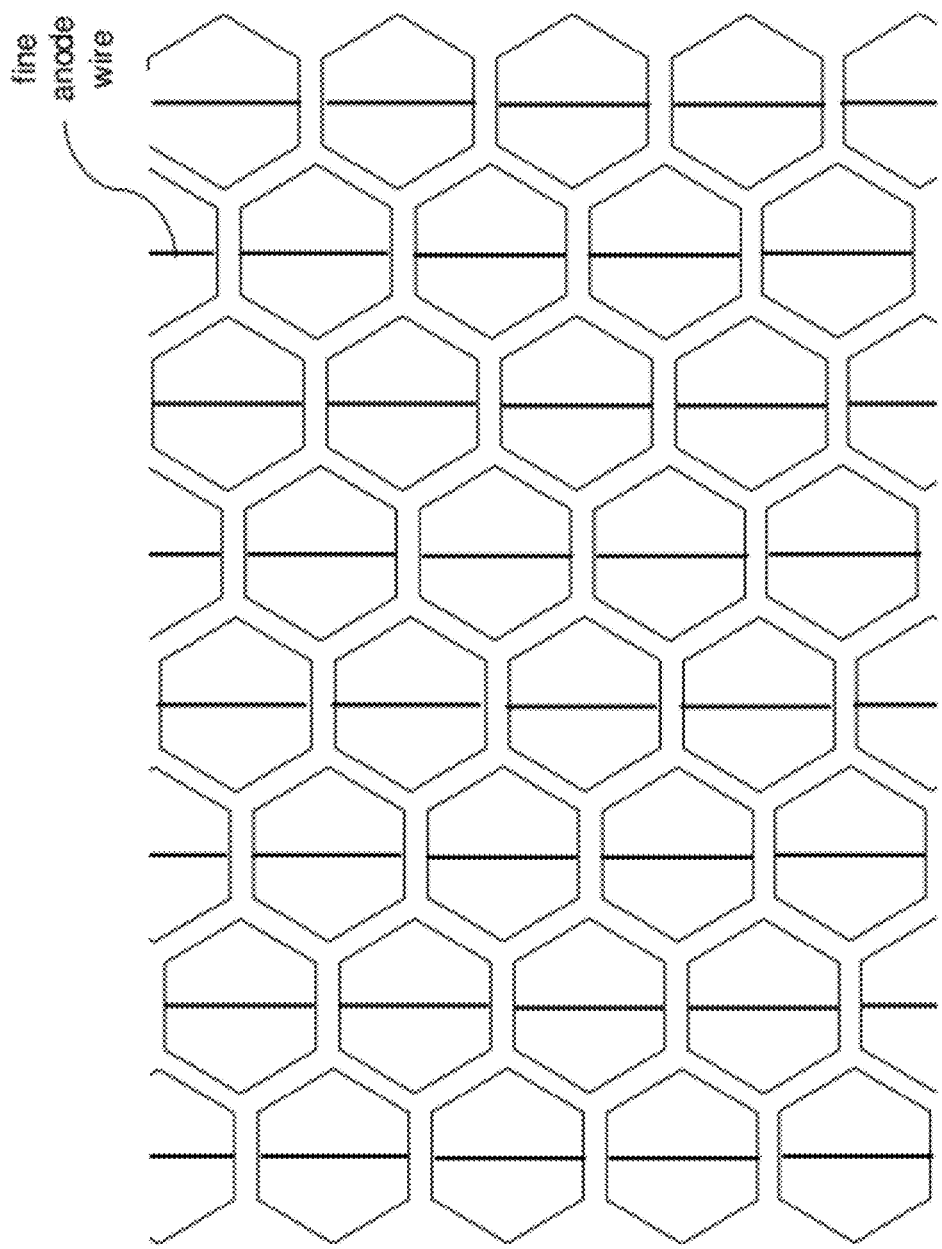
FIG. 8B illustrates the alignment between channels and wire anodes in the exemplary neutron detector unit of FIG. 8A.

Referring to FIGS. 8A and 8B, an exemplary neutron detector unit according to a second embodiment of the present disclosure is illustrated in various views. FIG. 8A includes a top-down view in the upper left corner, and a front view in the lower left corner. A magnified view of a portion of the hexagonal array of channels is shown in an inset. FIG. 8B is a further magnified view of the hexagonal array of channels. This exemplary neutron detector unit is another panel-type neutron detector unit.

This panel-type neutron detector unit of FIGS. 8A and 8B can replace the single tube neutron detector unit of FIG. 2A, and can be connected to a DC voltage supply source and a current measurement device to form a panel-type neutron detector. Each wire anode among the plurality of cylindrical neutron detector units is electrically connected to a positive voltage supply node of the DC voltage supply source, and each tubular conductive cathode is electrically connected to a negative voltage supply node of the DC voltage supply source.

The neutron detector unit of FIGS. 8A and 8B includes at least one panel, which can be a front panel 810, a back panel 820, or a combination of a front panel 810 and a back panel 820. Each panel (810, 820) includes a plurality of channels therethrough. Each of the plurality of channels is laterally surrounded by a coating layer 420 (See FIG. 4) of a neutron-absorbing material.

The at least one panel includes at least one substrate structure 410 (See FIG. 4) on which a coating layer 420 (See FIG. 4) is coated. The substrate structure 410 can have the same composition as in the first embodiment. Specifically, the substrate structure 410 can include a plastic material, a ceramic material, or glass. In one embodiment, the substrate structure 410 can include mylar. Additional materials that can be employed for the substrate structure 410 include, but are not limited to, polytetrafluoroethylene (PTFE), polychlorotrifluoroethylene (PCTFE), polyphenylene sulphide (PPS), polyetheretherketone (PEEK), polyethylene, polyimide, and kapton. Further, the substrate structure 410 can have the same range of resistivity as in the first embodiment. For plastics that have outgassing characteristics, the coating layer 420 acts as a sealant that impedes release of electronegatives to the detector gas that fills inside of the neutron detector unit.

The composition and the thickness of the coating layer 420 can be the same as in the first embodiment. Specifically, the neutron-absorbing material can include at least one of a boron-containing material and a lithium-containing material. In one embodiment, the neutron-absorbing material can be a boron-containing material that includes boron at an atomic concentration greater than 5%. In another embodiment, the neutron-absorbing material can be a carborane or a derivative of a carborane. The coating layer 420 can have the neutron-absorbing material at any concentration discussed above.

In one embodiment, the neutron-absorbing material can be a lithium-containing material that includes lithium at an atomic concentration greater than 5%. In one embodiment, the coating layer can be a solid coating layer having a thickness from 10 nm to 2,000 nm.

The neutron detector unit of FIGS. 8A and 8B further includes at least one cathode located on one side of each of the at least one panel (810, 820). The at least one cathode can include a front cathode 830 located in front of the front panel and a back cathode 840 located behind the back panel.

The neutron detector unit of FIGS. 8A and 8B further includes an array of substantially parallel wire anodes located on another side of each of the at least one panel. One parallel wire anode among the array of substantially parallel wire anodes is labeled as a "fine anode wire." The composition and the dimension of each parallel wire anode of the second embodiment can be the same as the composition and the dimension of the wire anode of the first embodiment, respectively.

In one embodiment, the at least one panel can be a pair of panels including a front panel 810 and a back panel 820, and the at least one cathode can be a pair of cathodes including a front cathode plate 830 and a back cathode plate 840. In this case, the array of substantially parallel wire anodes is located between the pair of panels (810 and 820). The front cathode plate 830 can be located in front of the front panel 810, and the back cathode plate 840 can be located behind the back panel 820.

Each of the at least one panel (810, 820) is a frame structure including a substrate structure 410 (See FIG. 4) made of a non-conducting material, and the coating layers 420 on the frame structure. The substrate structure 410 can include the same material as in the first embodiment. The coating layers can include the same material and have the same thickness as in the first embodiment.

In one embodiment, the at least one panel (810, 820) can be spaced from the at least one cathode (830, 840). The spacing can be from 10 micron to 1 mm, although lesser and greater spacings can also be employed. In another embodiment, the at least one panel (810, 820) can be in contact with the at least one cathode (830, 840).

The lateral dimension, i.e., the width w, and the vertical dimension, i.e., the height h, of each of the at least one panel (810, 820) and the at least one cathode (830, 840) can be from 1 inch to 40 inches, although lesser and greater dimensions can also be employed.

In one embodiment, the at least one panel includes a pair of panels (810, 820) separated by a spacing, and the array of substantially parallel wire anodes can be located within the spacing. If the at least one cathode includes a front cathode plate 830 and a back cathode plate 840, the depth of the neutron detector unit is determined mostly by a cathode spacing t between the front cathode plate 830 and the back cathode plate 840. The cathode spacing t can be from ¼ inch to 2 inches, although lesser and greater dimensions can also be employed. The lateral dimensions of each honeycomb structure can be substantially the same as in the first embodiment.

Various alterations can be made from the exemplary neutron detector illustrated in FIGS. 8A and 8B. In one embodiment, each of the plurality of channels can have a cross-sectional area that is independent of a distance from the array of substantially parallel wire anodes. In one embodiment, the cross-sectional area can be a polygonal cross-sectional area. In one embodiment, the cross-sectional area can be a hexagonal cross-sectional area.

In general, the array of substantially parallel wire anodes is positioned such that a portion of the array of substantially parallel wire anodes is in a line-of-sight from each point within each channel. In one embodiment, an inner surface of a cathode (e.g., the front cathode plate 830 or the back cathode plate 840) can be in another line-of-sight from each point within the channel. In one embodiment, another coating layer can be located on an inner surface of the at least one cathode. This coating layer can include the same neutron-absorbing material as the neutron-absorbing material of the coating layer 420 (See FIG. 4) or another neutron-absorbing material.

In one embodiment, the at least one cathode (830, 840) can be a portion of an air-tight enclosure in which the at least one panel (810, 820) and a portion of the array of substantially parallel wire anodes are enclosed. The array of the substantially parallel wire anodes is electrically connected to a positive voltage supply node, and the cathode is electrically connected to a negative voltage supply node as illustrated in FIG. 2A. A direct current (DC) voltage supply source is connected across the positive voltage supply node and the negative voltage supply node. A current measurement device is connected in series with the direct current voltage supply source.

Neutrons can be detected by applying a direct current (DC) voltage bias across the array of substantially parallel wire anodes and the at least one cathode, and by detecting neutrons by measuring current pulses that flow through a circuit of the neutron detector.

Figure 8C:
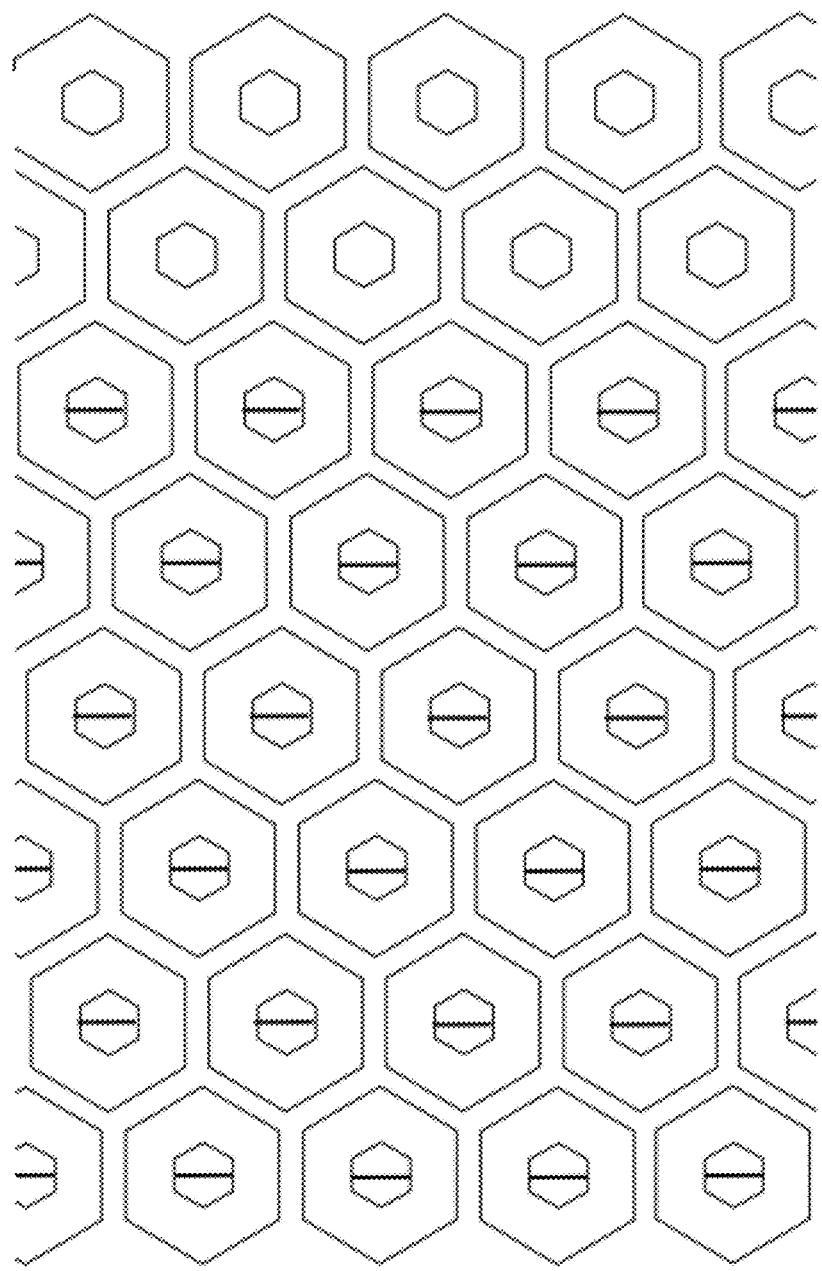
FIG. 8C is a side view of portions of a first variation of a frame structure according to the second embodiment of the present disclosure.

In some embodiments, each of the plurality of channels has a cross-sectional area that increases with a distance from the array of substantially parallel wire anodes. In one embodiment, the radial cross-sectional area can be a polygonal cross-sectional area. In one embodiment, the polygonal cross-sectional area has a polygonal cross-sectional shape that changes dimensions of sides in proportion to the distance from the array of substantially parallel wire anodes. Thus, the lateral distance between openings of an adjacent pair of channels is greater at channel opening proximal to the array of substantially parallel wire anodes than at channel openings distal to the array of substantially parallel wire anodes. Non-limiting examples of such embodiments are illustrated in FIGS. 8C, 8E, and 8G, which show a first variation, a third variation, and a fifth variation, respectively, of the frame structure that can be employed in the neutron detector unit of the second embodiment. The radial cross-sectional area can be a hexagonal cross-sectional area as illustrated in FIG. 8C, a triangular cross-sectional area as illustrated in FIG. 8E, or a rectangular cross-sectional area as illustrated in FIG. 8G.

In some other embodiments, each of the plurality of channels has a cross-sectional area that increases with a distance from the array of substantially parallel wire anodes. In one embodiment, the radial cross-sectional area can be a polygonal cross-sectional area. In one embodiment, the polygonal cross-sectional area has a polygonal cross-sectional shape that has a constant vertical dimension along a direction of the substantially parallel wire anodes irrespective of the distance from the array of substantially parallel wire anodes. Further, the polygonal cross-sectional area has a varying lateral dimension in a direction perpendicular to the substantially parallel wire anodes that increases with the distance from the array of substantially parallel wire anodes. Non-limiting examples of such embodiments are illustrated in FIGS. 8D and 8F, which show a second variation and a fourth variation, respectively, of the frame structure that can be employed in the neutron detector unit of the second embodiment. The radial cross-sectional area can be a triangular cross-sectional area as illustrated in FIG. 8D, or a rectangular cross-sectional area as illustrated in FIG. 8F.

Figure 8I:
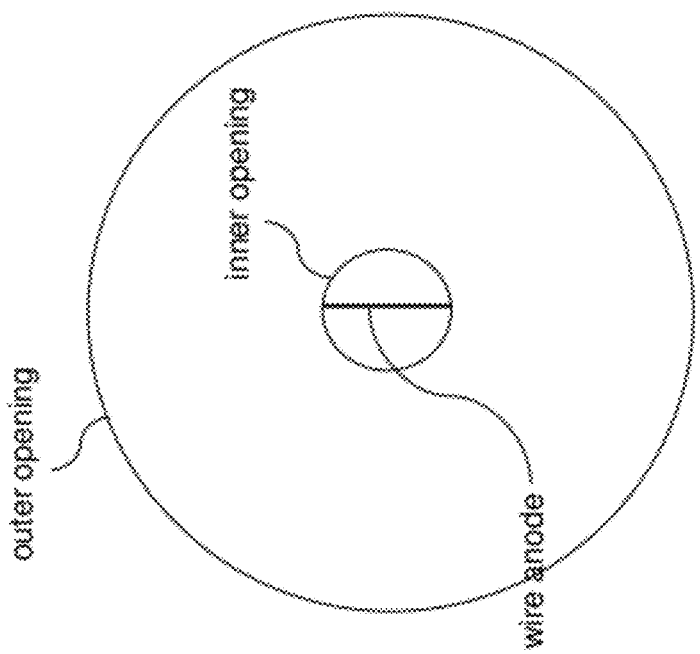
FIG. 8I is a side view of portions of a seventh variation of the frame structure according to the second embodiment of the present disclosure.
Figure 8H:
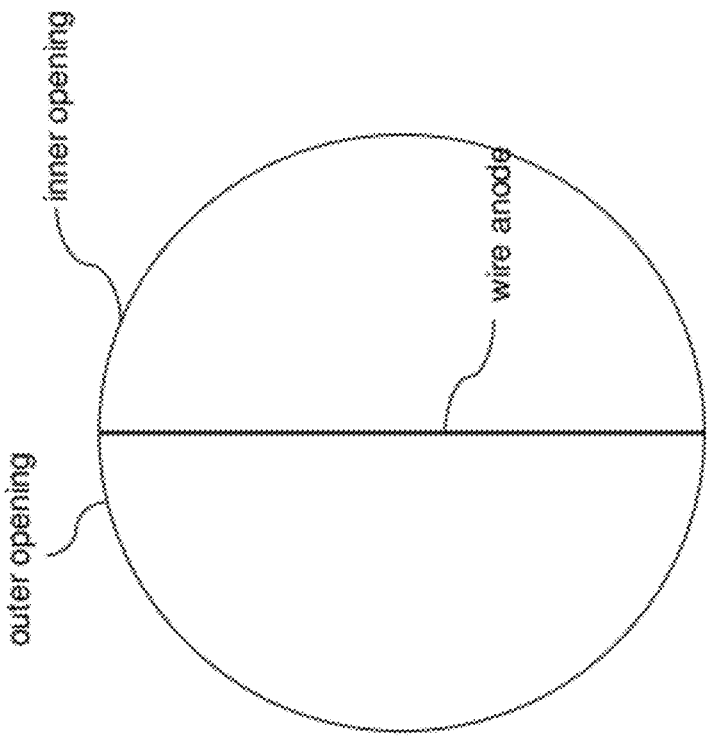
FIG. 8H is a side view of portions of a sixth variation of the frame structure according to the second embodiment of the present disclosure.

Referring to FIG. 8H, a sixth variation of the frame structure includes a plurality of channels having a constant cross-sectional area. Specifically, each of the plurality of channels can have a cross-sectional area that is independent of a distance from the array of substantially parallel wire anodes. In one embodiment, the constant cross-sectional area can have an elliptical shape, which includes ellipses and a circle.

Referring to FIG. 8I, a seventh variation of the frame structure includes a plurality of channels having a varying cross-sectional area. Each of the plurality of channels has a cross-sectional area that increases with a distance from the array of substantially parallel wire anodes, and the radial cross-sectional area can be an elliptical cross-sectional area. The radial cross-sectional area has an elliptical cross-sectional shape that changes dimensions in proportion to the distance from the array of substantially parallel wire anodes while maintaining a same ellipticity. The ellipticity can be zero in case of a circular cross-sectional area, or can be non-zero in case of a non-circular elliptical cross-sectional area.

In one embodiment, the radial cross-sectional area has an elliptical cross-sectional shape that has a constant vertical dimension along a direction of the substantially parallel wire anodes irrespective of the distance from the array of substantially parallel wire anodes, and has a varying lateral dimension in a direction perpendicular to the substantially parallel wire anodes that increases with the distance from the array of substantially parallel wire anodes.

FIG. 8I is a side view of portions of a seventh variation of the frame structure according to the second embodiment of the present disclosure.

Figure 9:
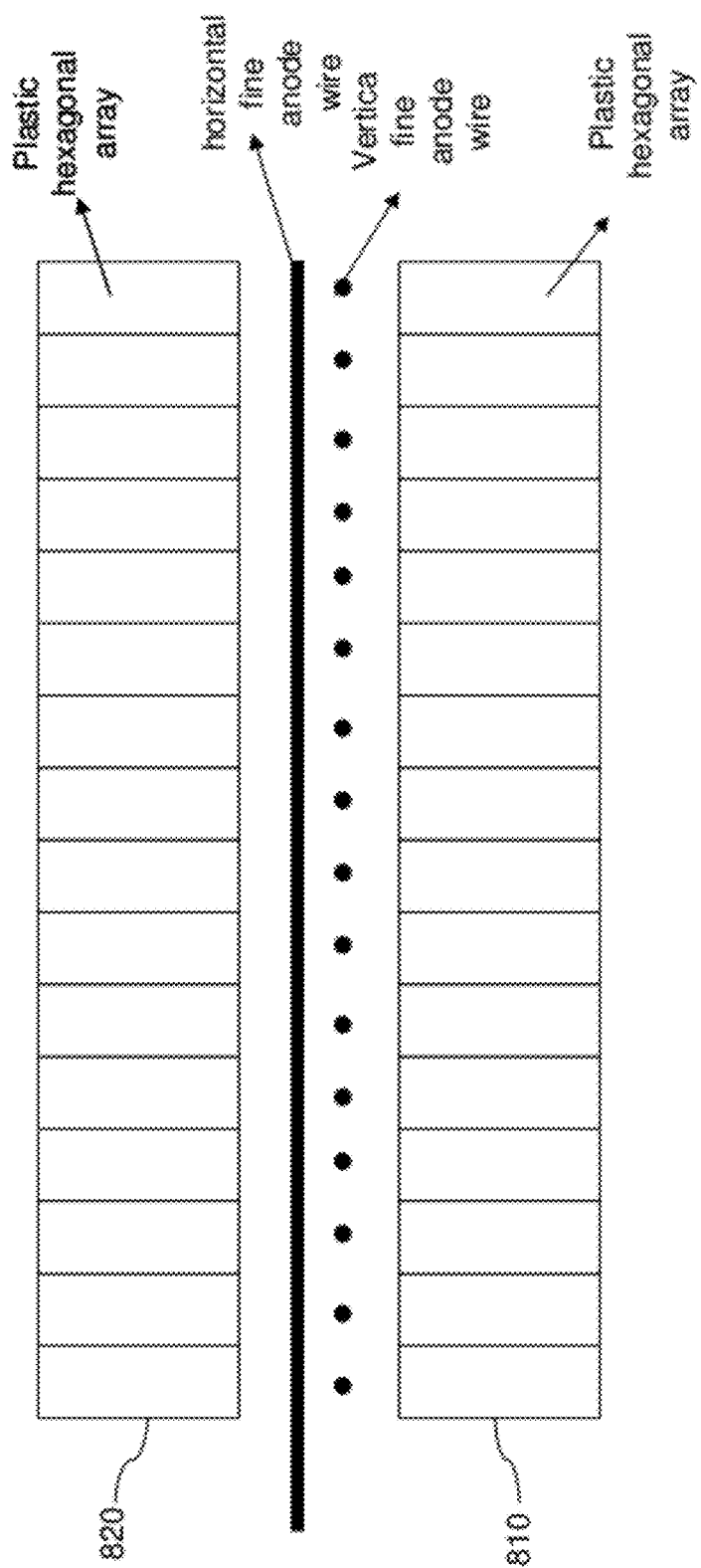
FIG. 9 is another exemplary neutron detector unit including a plurality of arrays of substantially parallel wire anodes according to the second embodiment of the present disclosure.

Referring to FIG. 9, another exemplary neutron detector unit is illustrated, which includes a plurality of arrays of substantially parallel wire anodes. The neutron detector unit includes a first array of substantially parallel wire anodes extending along a first direction and a second array of substantially parallel wire anodes extending along a second direction that is substantially perpendicular to the first direction. For example, the plurality of arrays can include a horizontal array of substantially parallel horizontal wire anodes and a vertical array of substantially parallel vertical wire anodes. The horizontal array of substantially parallel horizontal wire anodes and the vertical array of substantially parallel vertical wire anodes can be connected to two separate series connections of a current measurement device and a direct current voltage supply source so that the two-dimensional coordinate of detection of a neutron can be resolved. In this case, the lateral size of each channel in the front panel 810 or in the back panel 820 is the minimum resolvable dimension, i.e., the resolution, of the two-dimensional detector system.

Figure 10:
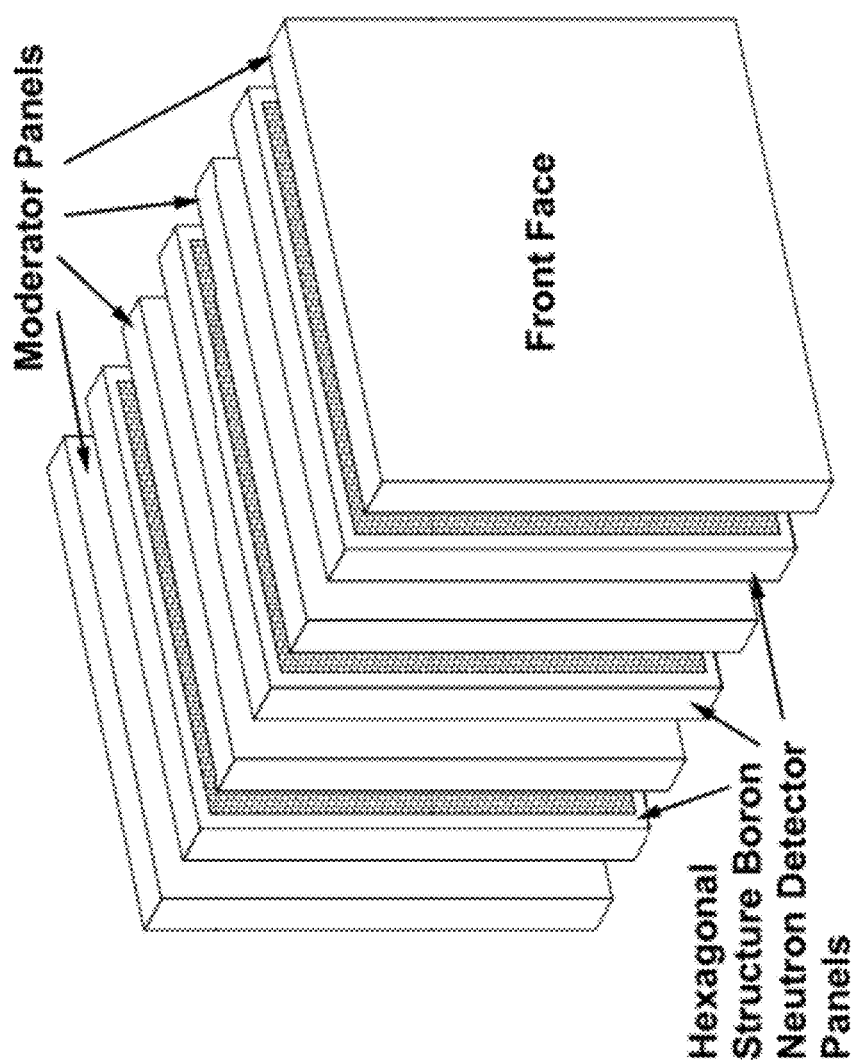
FIG. 10 is a neutron detector including a plurality of neutron detector units and moderator units that are alternately placed to permit neutron energy spectrum measurement by depth of penetration.

The structured surfaces of the detector technology of the present disclosure can be utilized at many different sizes and in numerous physical configurations. As illustrated in FIG. 10, multiple panel-type neutron detector units of the first and second embodiments can be vertically and/or horizontally stacked to form large panels of greater surface area. In one embodiment, at least one moderator unit including a moderator material can be placed in front of, and/or behind, one or many of the plurality of the panels.

In one embodiment, a neutron detector can include a plurality of planar neutron detector units, i.e., a plurality of panel-type neutron detector units. Each of the plurality of neutron detector units includes at least one panel, at least one cathode, and at least one array of substantially parallel wire anodes.

In one embodiment, a neutron detector including a plurality of neutron detector units and moderator units that are alternately placed to permit neutron energy spectrum measurement by depth of penetration. In one embodiment, at least one moderator unit can be provided on, or in a vicinity of, the one or more neutron detector units. Each of the at least one moderator unit can be placed between a pair of planar neutron detector units selected among the plurality of neutron detector units.

For example, stacking a plurality of neutron detector units permits collecting neutron energy spectrum information. Neutron energy can be determined from penetration, i.e., how much moderator material a neutron goes through before detection. During the course of study leading to the present disclosure, measurements were taken with two neutron sources having each fission and thermal spectrums. The two neutron sources were an unshielded $^{252}$Cf neutron source and an AmLi source housed in a polyethylene moderating box, respectively. The sources were placed at the front face of three stacked planar $^3$He shell-based neutron detectors having a surface area of 144 square inches and 2 inches deep. Polyethylene moderating panels were placed between each detector layer in a configuration that is similar to the configuration of FIG. 10.

Figure 11:
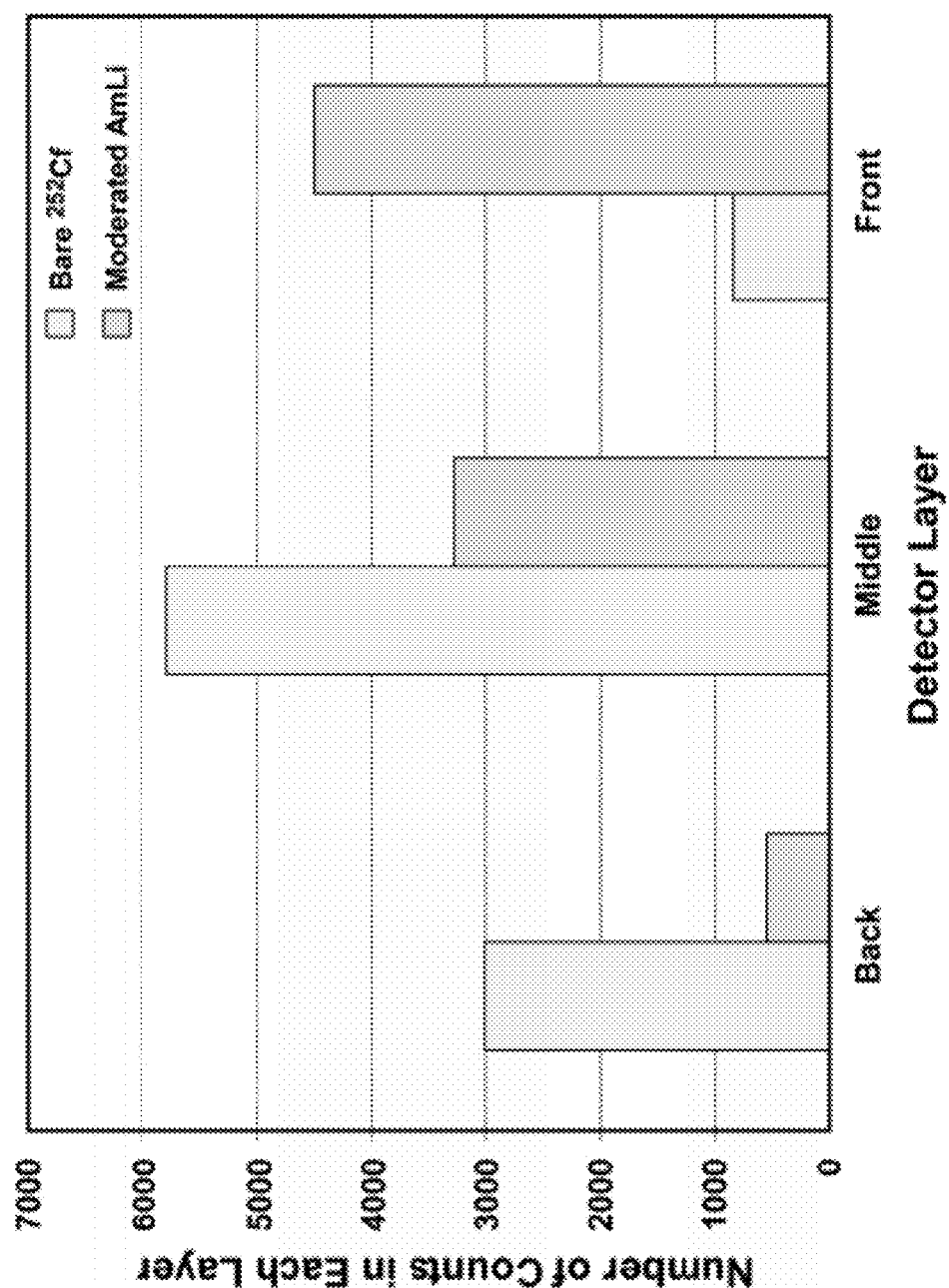
FIG. 11 is a graph showing comparison of count rates by layer in a three-layer detector that has interleaving moderator panels.

FIG. 11 shows comparison of count rates by layer in this three-layer neutron detector that has interleaving moderator panels. The middle and back layers provide for the majority of the detection events for the fission spectrum source due to the minimum amount of moderator material at the front layer. For the thermal spectrum, the front layer count rate dominates over the inner layers. While this experiment was conducted with shell detectors and that the middle layer had twice the number of $^3$He shells, a neutron detector including multiple stacks of interlaced panel neutron detector units and moderator units constructed according to embodiments of the present disclosure can also enable energy determination because of the increasing moderation that neutron undergo with depth of penetration.

Figure 12:
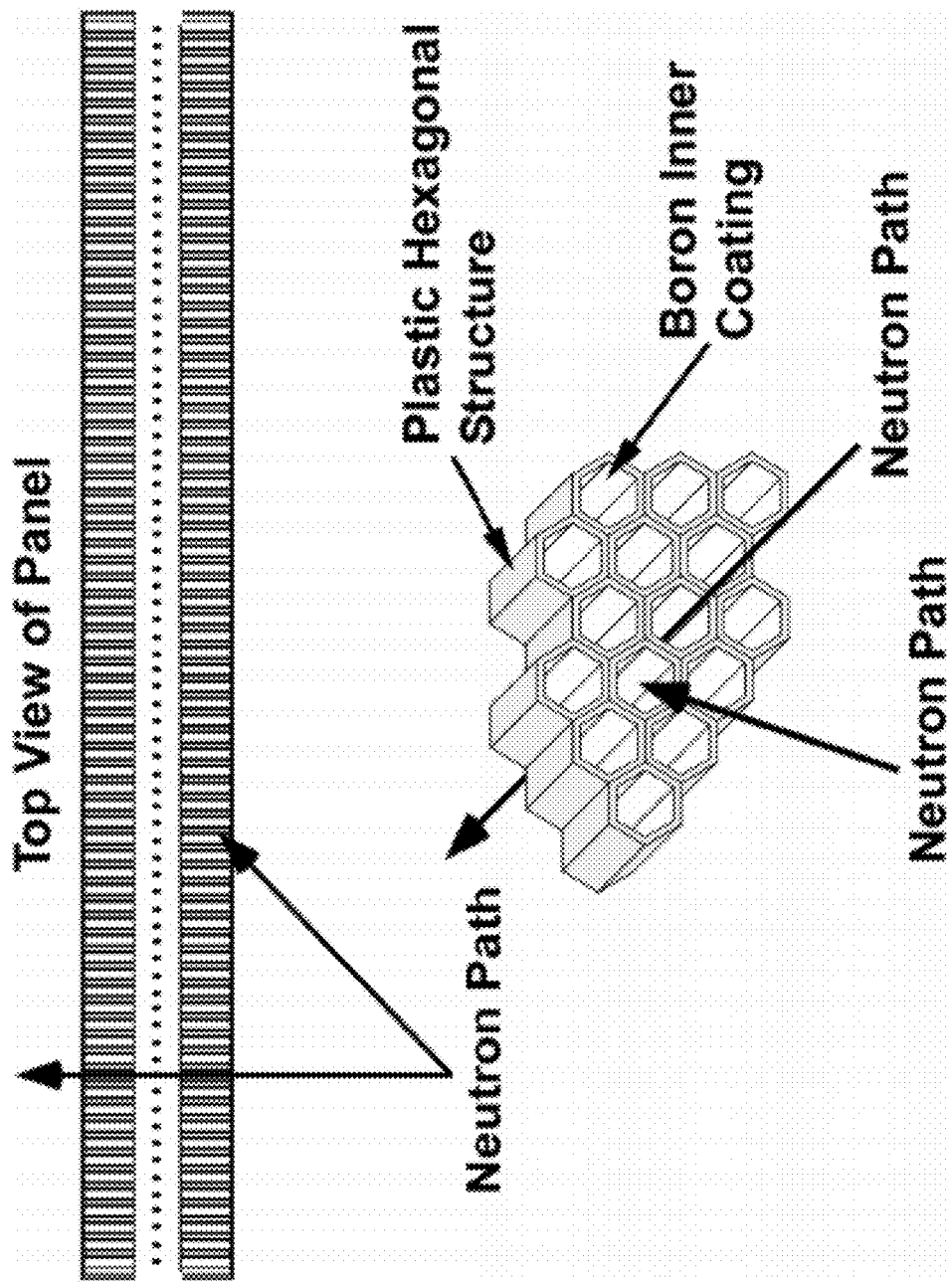
FIG. 12 is a schematic diagram that illustrates that straight-in neutrons can pass through honeycomb without interaction. Angled neutrons will pass through one or more boron coated walls with possible interaction.

Referring to FIG. 12, a schematic diagram illustrates that straight-in neutrons can pass through honeycomb without interaction. Angled neutrons will pass through one or more boron coated walls with possible interaction. A characteristic of the structure of FIGS. 8A-8I, 9, and 10 is that some straight-in neutrons that impinge in a direction perpendicular to the panel(s) may pass through the neutron detector unit(s) without interacting in a coated layer 420 (See FIG. 4). This is not believed to be a problem since neutrons scattered in the slowing-down process follow a meandering path, and therefore, no angle is preferred. Thus, the probability of non-interaction because of this geometric effect is negligible. The interior of the enclosure that houses the panel of the second embodiment or the frame structure of the first embodiment can be coated with a boron-containing material or a lithium-containing material for slightly increased efficiency.

As is typical of a proportional counter, virtually all of the charge generated originates within the avalanche region. Drift time (i.e., time required for free electrons to travel to the anode) is much greater than the avalanche time. Gas gain expectations are from $10^2$ to $10^5$. Gas gain varies inversely with pressure and anode diameter as indicated in Eq. (1). Therefore, near atmospheric detector pressures along with small anode diameters will allow high gas gains.

$$\ln M = \frac{V}{\ln(b/a)} \cdot \frac{\ln 2}{\Delta V} \left( \ln \frac{V}{pa \ln(b/a)} - \ln K \right), \quad \text{Eq. (1)}$$

where M=gas multiplication factor, V=applied voltage, a=anode radius, b=cathode radius, p=gas pressure, $\Delta V$=potential difference through which electron moves between successive ionizing events, and K represents the minimum value of electric field per unit pressure below which multiplication cannot occur.

Figure 13:
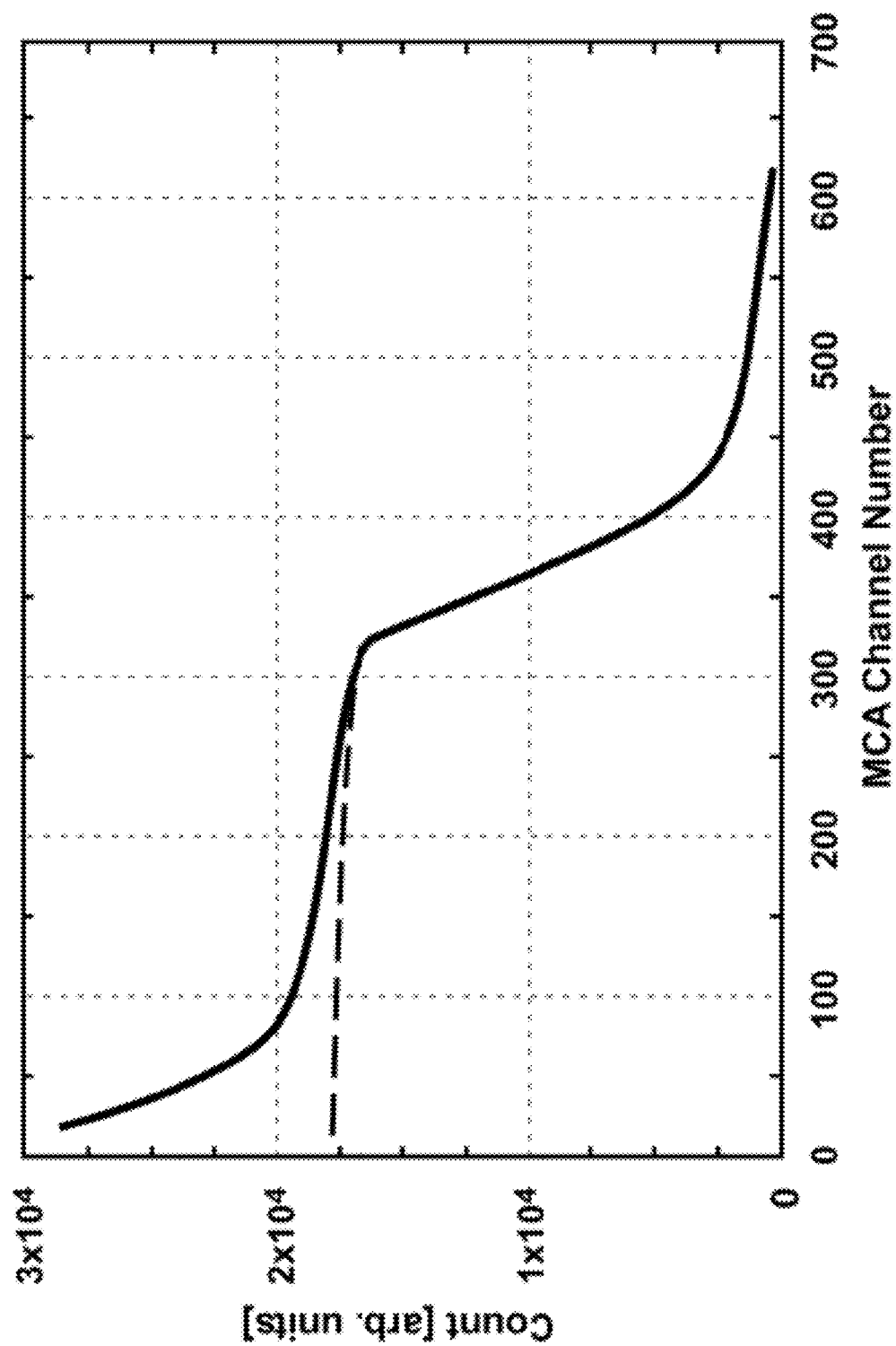
FIG. 13 is a graph showing pulse height spectrum of a boron lined neutron detector. The energy deposition of the daughter products is not necessarily complete; hence, the spectrum can have a flat region.

The pulse height spectrum is expected to be relatively flat and not have the full energy deposition of the energetic daughter products. An illustration of the expected spectrum is shown in FIG. 13, which shows pulse height spectrum of a boron lined neutron detector. The channel number is proportional to the voltage of an electronic pulse generated from a neutron detector of the present disclosure. The vertical axis is the count, or the number of times, that each channel is triggered during a neutron detection run. The asymptotic solid line below channel number 350 is due to electronic noise of the neutron detector unit. The dotted line represents the true count that excludes electronic noise.

The graph corresponds to the probability distribution for registering various voltages with a neutron detector of the present disclosure for each neutron detection event. The energy deposition of the daughter products is not necessarily complete in the detectors units of the present disclosure. Hence, the electronic-noise-subtracted spectrum (including the dotted line) has a flat region in contrast with an energy spectrum from conventional neutron detectors, which show a marked peak around a certain energy.

The neutron detector of the present disclosure operates as a proportional counter. The proportional counter output derived from gas multiplication of electrons near an anode wire or an array of substantially parallel anode wires is significantly higher than corresponding electron multiplication in ion chambers. Traditional charge-sensitive pre-amplification can still be used at a lower gain during operation of the neutron detector of the present disclosure than during operation of an ion chamber. No special preamplifier requirements are expected for the tube design. Because of added capacitance of the plate design, some minor modification of existing charge-sensitive preamplifiers can be used. Because of a large amplification factor, microphonics and electromagnetic inference (EMI) are not expected to be a problem for the neutron detector of the present disclosure.

In one embodiment, non-conductive material can be placed between cathode electrode(s) if needed. The anode wire(s) are small enough to create a high electric field gradient, which means that the anode should not be coated with an insulator.

For illustrative purposes, a 1.47 MeV alpha particle has a range about 7.8 μm in Ar at standard temperature and pressure. For open spaces smaller than the alpha range, the alpha will continue through the gas and be stopped by the next internal structure component. Because of the exceptional gas gain of the proportional counter, a sufficient quantity of ionizations will occur along the gas path length to develop a detectable charge pulse.

The neutron detector of the present disclosure provides significant improvements in sensitivity. The limitation to obtaining high efficiency with a solid boron type neutron detector is the short range of the energetic daughter particles in the solid boron. In order to absorb nearly all of the incident thermal neutrons, the boron layer thickness needs to be nearly 100 μm, yet the range of the daughter particles emerging from the $^{10}$B(n,α)7Li reaction is only a few microns. The boron layer itself is not an active charge collecting area of the detector thus many thin layers are required in order to achieve high efficiency. Essentially an energetic daughter particle needs to emerge from the boron solid layer and create free electron-ion pairs in an active detector volume for the interaction event to be recorded. Further, since neutron capture is unlikely to occur with the exterior surface of the boron some of the daughter particle energy will be deposited in the intervening material before the particle escapes into the gas volume. The energy loss in the inactive boron layer both prevents spectroscopic analysis of the neutron pulses and necessitates large signal gain within the gas to obtain a sufficiently large electrical pulse for measurement.

Figure 14:
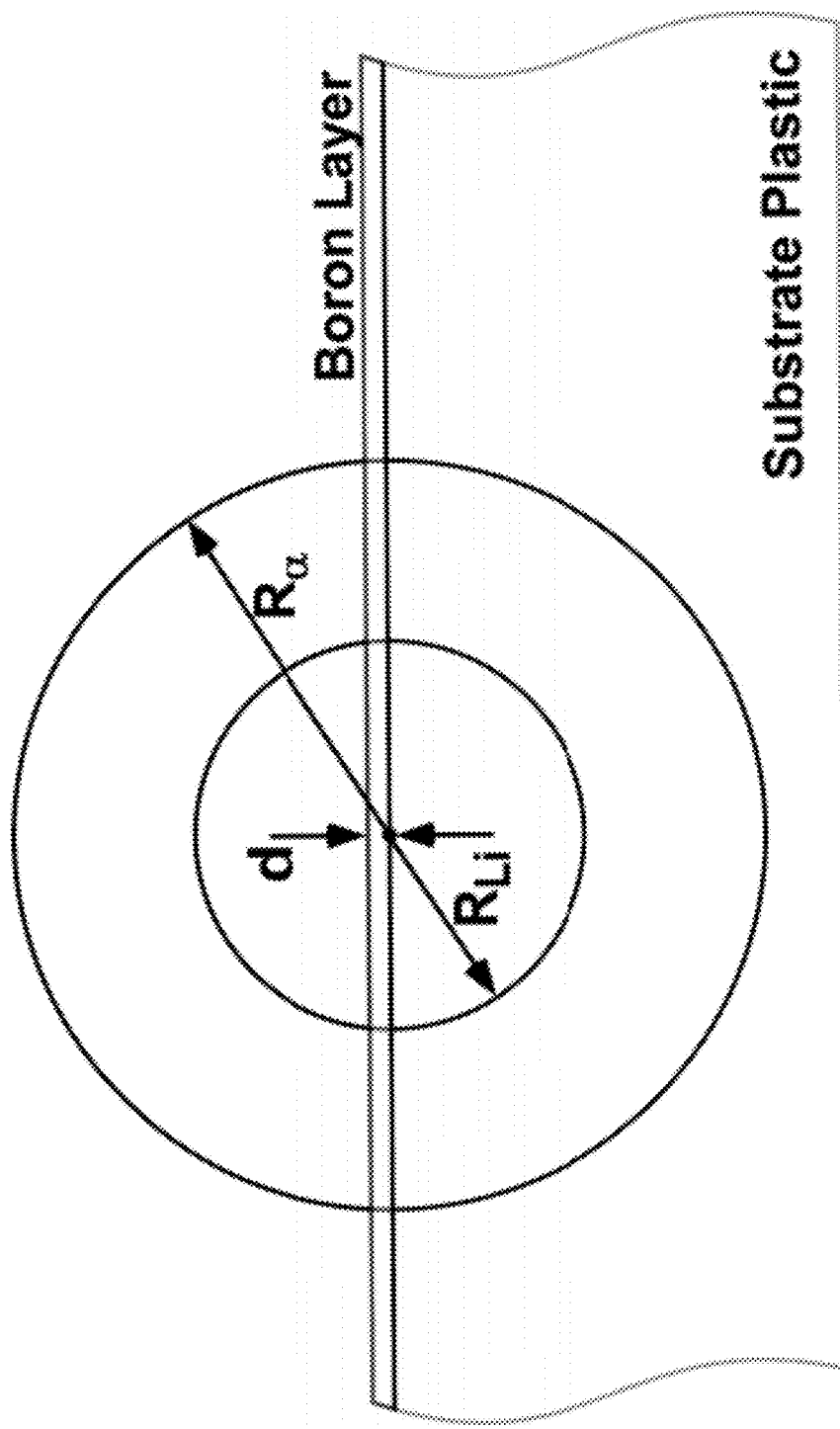
FIG. 14 is a schematic diagram illustrating daughter particle ranges ($R_\alpha$ and $R_{Li}$) compared to boron layer depth (d).

Referring to FIG. 14, if the range of an alpha particle in a solid boron layer is $R_\alpha$ (3.53 μm) and the range of a $^7$Li ion is $R_{Li}$ (1.83 μm) for a neutron absorbed at depth d in a solid boron layer, then the escape probability E for an energetic daughter particle is given by the Eq. (2).

$$d < R_{Li} \qquad \text{Eq. (2)}$$
$$E(d) = \frac{\cos^{-1}\left(\frac{d}{R_{Li}}\right) + \cos^{-1}\left(\frac{d}{R_\alpha}\right)}{\pi}$$
$$R_{Li} \le d < R_\alpha$$
$$E(d) = \frac{\cos^{-1}\left(\frac{d}{R_\alpha}\right)}{\pi}$$
$$d > R_\alpha$$
$$E(d) = 0$$

Figure 15:
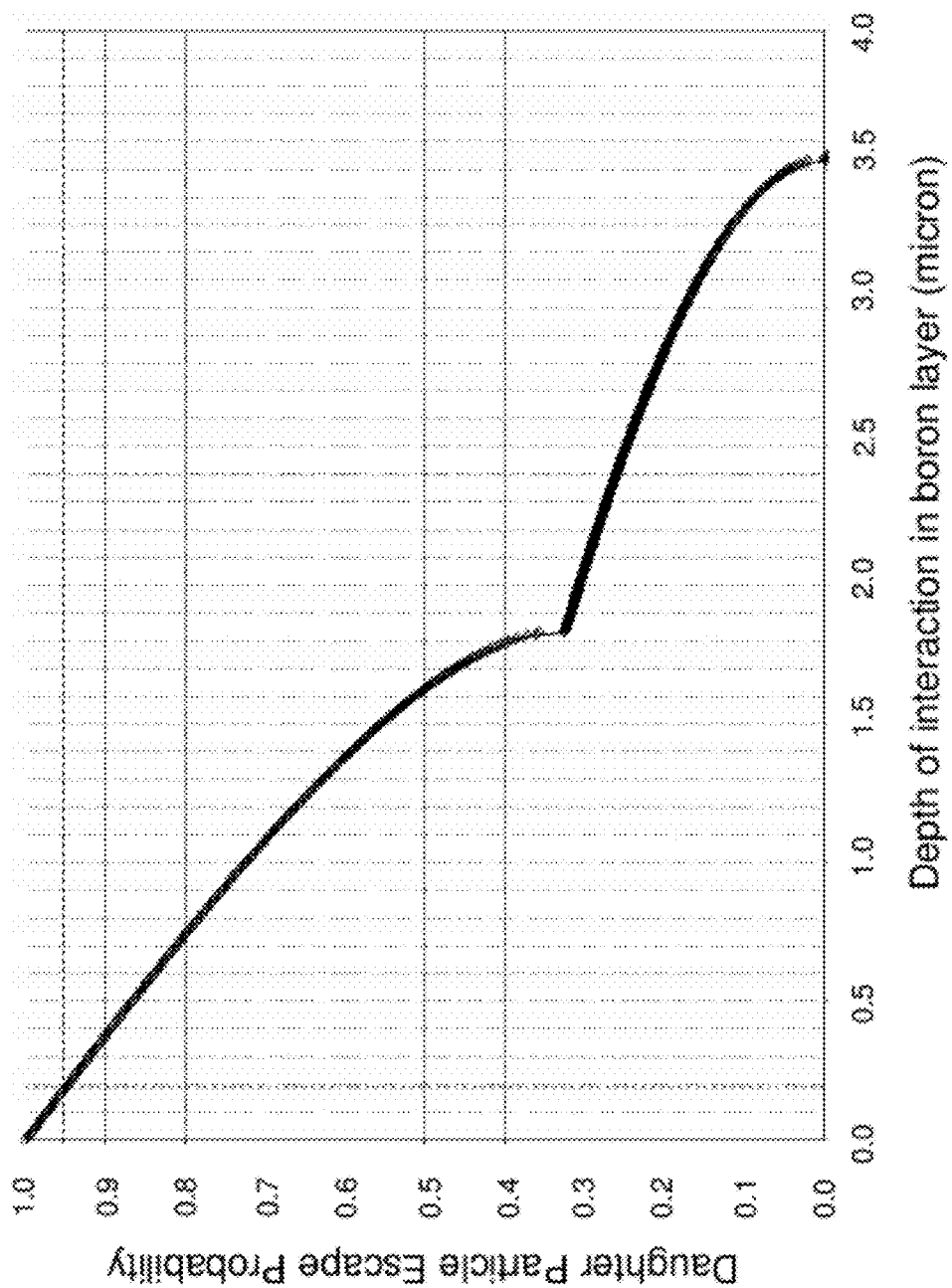
FIG. 15 is a graph of escape probability of boron daughter particles from $^{10}B(n,\alpha)^7Li$ reaction versus thickness of pure boron layer. Maximum energies of daughter particles are 0.84 MeV and 1.47 MeV, for Li and $\alpha$ respectively.

Referring to FIG. 15, the escape probability of boron daughter particles from $^{10}B(n,\alpha)^7Li$ reaction versus thickness of pure boron layer. Maximum energies of daughter particles are 0.84 MeV and 1.47 MeV, for Li and $\alpha$, respectively. For a detection efficiency goal of 95 percent (equivalent to a $^3$He tube) then no more than 5 percent of the neutrons can be lost during detection. This means that the boron layer can be at most 0.2 µm thick as illustrated in FIG. 15 for the ranges given above. For material less dense than solid boron, a thicker layer would be allowed. Such would be the case for a boron-carbon compound whose density would be less than half that of solid elemental boron.

Neutrons emerging from SNM isotopes have fission spectrum kinetic energies. The useful neutron conversion reactions all have inverse velocity dependent cross-sections. Hence, the neutrons need to be slowed down prior to interaction within the detector. Hydrogen is the most effective moderator nucleus. However, hydrogen also has an inverse neutron velocity dependent parasitic absorption cross-section. It is, therefore, required to locate neutron detectors proximate to the moderating hydrogen nuclei prior to their absorption in nearby hydrogen nuclei. The competing absorption reaction results in the most efficient detection structure being multiple small neutron detectors dispersed within a hydrogenous moderating block as opposed to large, independent neutron detectors widely spaced within a moderator.

Various chemistries can be employed for uniformly coating the surfaces of MSG detector elements. Polymers for forming the structured internal elements of these detectors can be chosen for their ability to be mass produced by a stamping or a hot injection molding process as well as their ease of chemical surface modification. In general, engineered thermoplastic polymeric materials such as polystyrene, polyacrylics, polyesters, and epoxides have functional groups that allow the surface to be modified. Polymers such as Teflon or a high density polyolefin are more difficult to be chemically modified. An enormous variety of thermosetting polyesters have been reported and these materials have been utilized for many commercial products. In one embodiment, the selected material can be a polyester polymer or copolymer with the appropriate thermosetting properties and a functionality to allow the surface to be modified by the formation of brush-like polymeric surface structures that contains the carborane groups. The modification of surfaces, including polymer surfaces, with thin polymer films can be accomplished by depositing or spraying a polymeric coating from solution.

Alternatively, polymers with reactive end-groups can be grafted onto surfaces, resulting in so-called polymer brushes. These polymer chains are referred to as brushes because the chains form a dense deposit in which the chains grow perpendicular to the surface grafted to. These solvent mediated reactions can occur inside structures or at the surfaces of non uniform materials. These polymer brushes are prepared by grafting polymers to surfaces via chemical bond formation between reactive groups on the surface and reactive end-groups. A variety of chemical polymerization processes including a surface initiated process can be employed.

Figure 16:
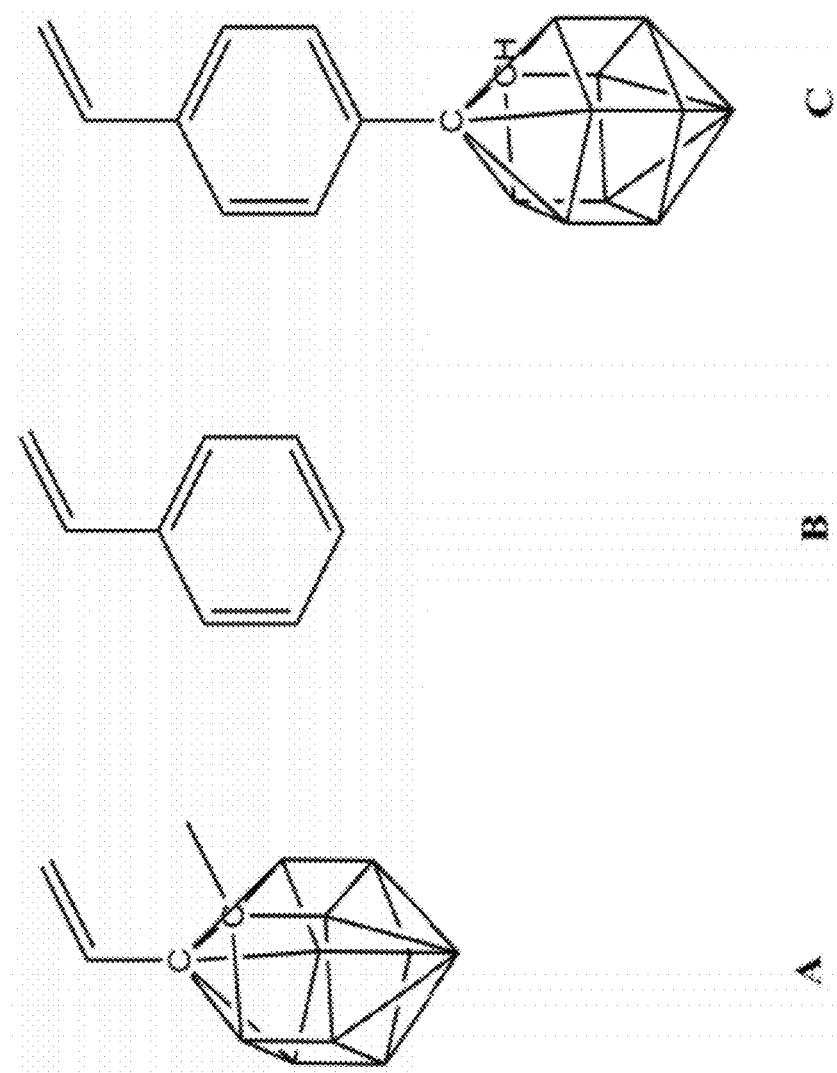
FIG. 16 shows precursors to polymers including (A) 1-methyl-2-vinylcarborane, (B) styrene, and (C) 4-carboranestyrene.

A boron containing polymer coating can include a 1:1 co-polymer of 1-methyl-2-vinylcarborane and styrene. FIG. 16 shows precursors to polymers including (A) 1-methyl-2-vinylcarborane, (B) styrene, and (C) 4-carboranestyrene. A 1:1 copolymer of these compounds should have a density of 0.9 g/cm$^3$ to 1.1 g/cm$^3$ and has a composition of 38 percent boron by weight. Carborane is readily available as natural abundance boron (20 percent $^{10}$B), and can be employed to form a coating layer of the present disclosure. The boron containing polymer coating can be formed, for example, by painting, spraying, spin-coating, direct chemical reaction of a carborane containing precursor, or any other deposition method that forms a solid layer from a liquid, a gas, an aerosol, or any other precursor material.

Gamma ray interactions result in energetic electrons being produced. Energetic electrons, due to their high charge to mass ratio, have characteristic energy deposition ranges on the order of centimeters and highly tortuous slowing down paths as they collide with identical mass bound electrons. A structured internal type neutron detector as provided in the neutron detector unit of the present disclosure does not have free paths more than a few millimeters in length. Thus, an interacting gamma ray's resultant energetic electron can only deposit a few percent of its energy in the active detector volume thereby greatly reducing the detector sensitivity to gamma rays.

In general, the high gain requirements of ion chambers make a detector array subject to vibration-induced noise generation. In general, the higher gain in the tube, the lower the required preamplifier gain to produce a measureable electronic signal. Lower preamplifier gain translates directly to lower noise susceptibility. Reduction of susceptibility to mechanical shock improves neutron detector performance. Moving or brittle parts or sensitive electro-optical devices are not required in the neutron detector of the present disclosure. The neutron detector of the present disclosure can be made impervious to humidity and rain by enclosure in a protective housing.

Large detection surface areas and energy discrimination capability of the neutron detector of the present disclosure provide advantages over $^3$He tube designs in identifying SNM under a variety of placement scenarios. Panel detectors can operate in proportional mode because the gas pressure is atmospheric. Thus, the forces on flat exterior surfaces are low. Panels of the neutron detector units of the present disclosure do not, therefore, require massive bracing.

The MSG method can be scaled down to provide efficiency in smaller detectors for use in backpacks and handheld devices. Smaller structures will require thinner plastic components, which are feasible. The plastic inner structure can support its own mass under the maximum acceleration conditions during the operation of the neutron detector of the present disclosure.

Cost of ownership for detectors based on the MSG technology can be favorable especially considering the cost of $^3$He is practically indeterminable. Low acquisition cost is a major contributor to improving the total cost of ownership. Signal processing electronics are expected to be virtually identical in cost to existing detectors. Particularly, tube-type neutron detectors of the embodiment of the present disclosure can have low cost. Shipping restraints will be lessened since no high pressures are involved. Further, panel type neutron detectors of the embodiments of the present disclosure can offer substantial cost savings over tube types when normalized to area coverage. Unlike prior art detector products that require costly materials and batch production, the MSG technology of the present disclosure can integrate low-cost materials (plastic, inert gas, and aluminum housing) with low-cost, high-yield continuous production via high-speed processes adapted from existing industrial manufacturing methods such as injection molding. Operational costs can also be low because the MSG detectors of the embodiments of the present disclosure provide high neutron detection efficiency and low susceptibility to false counts from gamma, thereby minimizing false positives.

In implementing the neutron detector units of the embodiments of the present disclosure, there can be trade-offs in neutron signal size between the number of ionizations created in a sensor, the bias voltage, gas mixture, gas pressure, boron-layer thickness, anode size and spatial distances of the components. Wall effects on the energetic daughter products will be important drivers in structural sizing since the alpha range in argon is about 7.8 mm.

Figure 17:
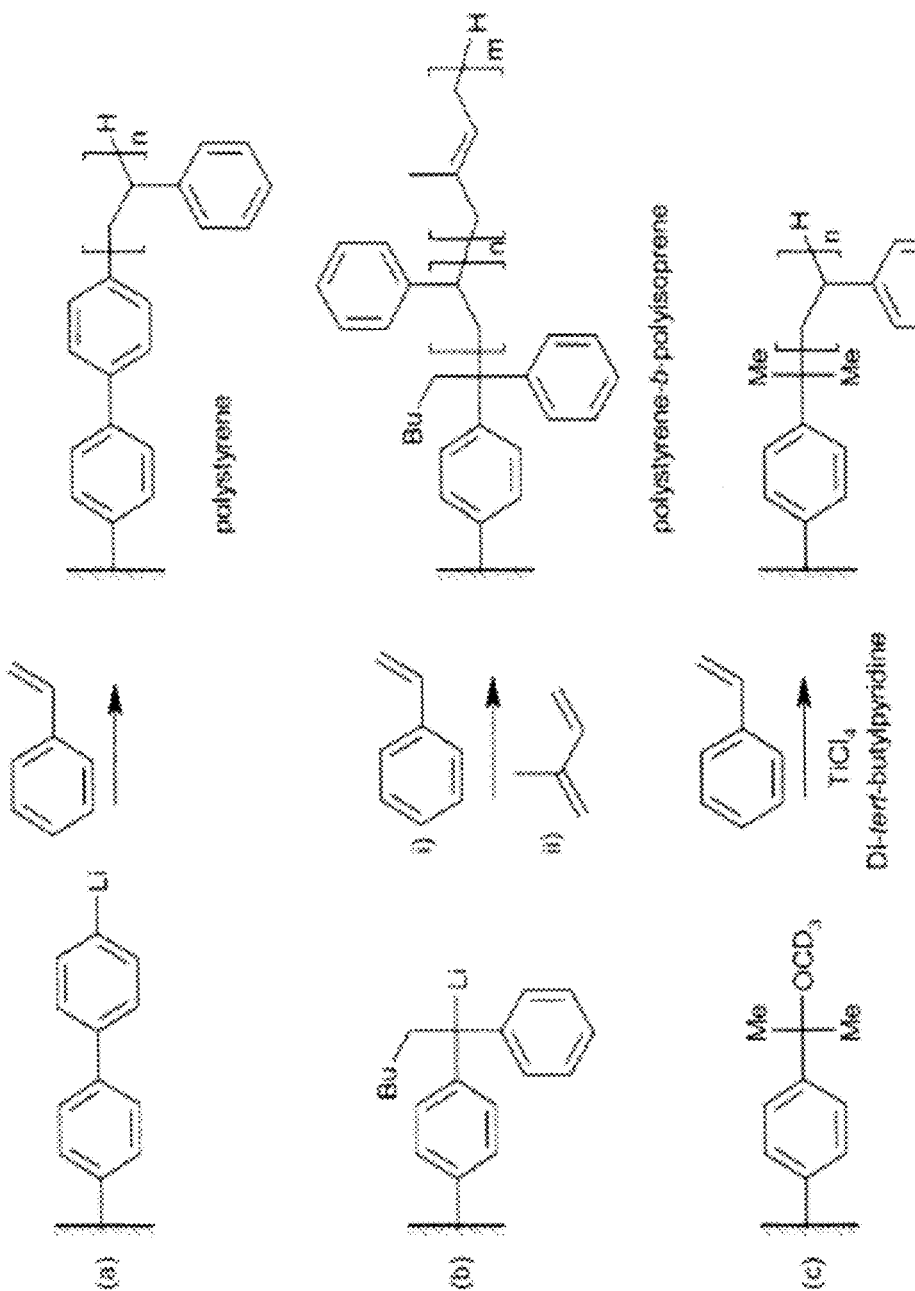
FIG. 17 illustrates non-limiting examples of reactions for growing polymer brush films by anionic (a and b) and cationic (c) initiation processes.

For formation of the coating layer 420 (See FIG. 4), siloxane derivatives of m-carborane can be employed for the preparation of polymeric silicone rubber scintillators for neutron sensitivity. Further, olefinic and styrenic based polymers containing carboranes can also be employed. Carborane can be employed as the boron source for coating the thermosetting polymer supports. The chemical reactions for the preparation of polystyrene based polymer films can also be employed. FIG. 17 illustrates non-limiting examples of reactions for growing polymer brush films by anionic (a and b) and cationic (c) initiation processes.

These reactions are expected to be effective for preparation of polymer brushes based on carborane containing precursors shown in FIG. 16. In one embodiment, thermosetting plastic can be employed as a substrate structure 410 (See FIG. 4), which can then be coated with a sufficient thickness of a carborane containing polymer. The reactions described above can be employed to coat the inner surfaces of plastic tubes.

In one aspect, a hexagonal internal structure in the neutron detector units of the embodiments of the present disclosure provide increased surface area for neutron capture relative to a planar geometry structure. Further, the radial orientation of the channels in the honeycomb allows electric field lines emanating from the anode to draw free electrons to the wire anode(s) without impinging on any intervening plastic surfaces.

In one embodiment, a slight electrical conductance can be added to the boron compound layer. In this case, a negative charge can accumulate in the coating layer so that electrons are repelled from, and not attracted to, the borated layer. An additional surface preparation may be provided for this purpose.

In one embodiment, a Frisch grid may be utilized to modify the field characteristics in the hexagonal channels. Channel sizing and spacing and the placement of a Frisch grid can have an effect on the performance of the neutron detector of the embodiments of the present disclosure.

In one embodiment, a uniform coating of a boron containing compound can be formed on the surface of the hexagonal internal structure. The plastic material is compatible with formation of the appropriate shape as well as being amenable to chemical modification. In one embodiment, thermosetting polyester is employed as the material for the substrate structure 410 (See FIG. 4).

In one embodiment, a tube-type neutron detector unit or a panel-type neutron detector unit can be effected by locking the individual structural components to form a rigid assembly inside a gas-tight enclosure. The material of the gas-tight enclosure can be, for example, aluminum. The enclosure can have gas connections that permit evacuation and filling with proportional counter gas (such as P10) during the fabrication process. End caps can be made to hold an anode wire or an array of substantially parallel anode wires. The inside of the enclosure can be coated with an appropriately thin layer of boron to acquire addition efficiency from neutron capture at the outside opening of the channels. The seal on the enclosure can be completed, and electrical connection can be brought out from the anode wire(s) and a cathode to connectors, which define the positive voltage supply node N1 and the negative voltage supply node N2 in FIG. 2A or in any equivalent circuit in which a different type of neutron detector unit(s) is employed. For example, the end caps and the gas connections can be welded to provide an air-tight seal.

During the fabrication of the neutron detector units of the present disclosure, the inside of the enclosure can be vacuumed to a pressure level on the order of 1 Torr or lower, followed by bakeout and fill with clean gas. In one embodiment, an assembled neutron detector unit can be baked at an elevated temperature (for example, at about 150° C.) as a part of vacuum preparation. Plastic parts and the coating material(s) can be selected to withstand the bakeout process. Filling process can be performed in a manner that does not introduce contamination. These steps can be repeated multiple times until the level of impurity gases in the enclosure reaches a trace level.

The surface chemistry of glass and quartz are characterized by Si—OH bonds and the surface of aluminum containing ceramics have Al-OH bonds. These surfaces can be modified by the reaction of siloxane forming reagents such as Si—Cl or Si—OR containing compounds. In one embodiment, during the preparation of carborane containing silicone rubber scintillators, commercially available reagent 1,7-bis(tetramethylchlorodisiloxy)-m carborane which is marketed under the trade name Dexsil 300M by Dexsii Carporation. The chemical formula of this compound is shown below:

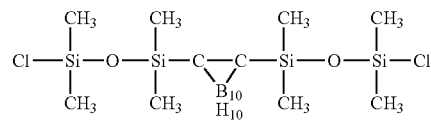

This compound reacts with Si—OH bonds to eliminate HCl and attach the carborane containing compound to the surface. Stepwise hydrolysis of the terminal Si—Cl bond to Si—OH followed by reaction with additional Dexsil reagent allows the surface to be modified with a layer containing the carborane. An analogous reaction can be conducted with aluminum oxide ceramics or other ceramics with robust M—OH bonds with the carborane containing reagent. Organic groups can be firmly attached to these surfaces that allow the organic polymer layer to be subsequently added.

In one embodiment, lithium can be employed in place of boron as a neutron absorbing coating. Lithium produces more energetic daughter products from the $^6$Li(n,α) reaction so that thicker coatings can be applied. Although $^6$Li has a lower thermal neutron cross section compared with $^{10}$B, $^6$Li can allow a thicker coatings providing net efficiency benefit in some cases.

Natural boron is made of two stable isotopes $^{11}$B (~80%) and $^{10}$B (~20%). The $^{10}$B isotope has about one million times the neutron absorption cross section of $^{11}$B. The methods and devices of the present disclosure can be implemented employing a boron-containing material in which the $^{10}$B isotope is enriched relative the $^{11}$B isotope. Alternately, if natural boron is employed without enrichment of the $^{10}$B isotope, more boron-containing material needs to be employed compared with a boron-containing material employing enriched boron to get the same detector efficiency.

While the invention has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the invention is intended to encompass all such alternatives, modifications and variations which fall within the scope and spirit of the invention and the following claims.

What is claimed is:

1. A neutron detector comprising:
a tubular conductive cathode laterally surrounding a volume therein;
a wire anode located within, and along an axial direction of, said tubular conductive cathode; and
a frame structure including an assembly of a plurality of embossed disks that are stacked within, and along said axial direction of, said tubular conductive cathode, wherein said plurality of embossed disks are azimuthally offset among one another within said assembly that so that a plurality of radial channels having radially-increasing hexagonal cross-sectional areas is present between said tubular conductive cathode and said wire anode within said assembly, wherein each of said plurality of radial channels is laterally surrounded by a coating layer of a neutron-absorbing material.

2. The neutron detector of claim 1, wherein said neutron-absorbing material includes at least one of a boron-containing material and a lithium-containing material.

3. The neutron detector of claim 1, wherein said neutron-absorbing material is a boron-containing material that includes boron at an atomic concentration greater than 5%.

4. The neutron detector of claim 1, wherein said neutron-absorbing material is a carborane or a derivative of a carborane.

5. The neutron detector of claim 1, wherein said neutron-absorbing material is a lithium-containing material that includes lithium at an atomic concentration greater than 5%.

6. The neutron detector of claim 1, wherein said coating layer is a solid coating layer having a thickness from 10 nm to 2,000 nm.

7. The neutron detector of claim 1, wherein said polygonal cross-sectional area has a polygonal cross-sectional shape that has a constant vertical dimension along a direction of said wire anode irrespective of said radial distance from said wire anode, and has a varying lateral dimension in a direction perpendicular to said wire anode that increases with said radial distance from said wire anode.

8. The neutron detector of claim 1, wherein said polygonal cross-sectional area has a polygonal cross-sectional shape that changes dimensions of sides in proportion to said radial distance from said wire anode.

9. The neutron detector of claim 1, wherein at least one of said plurality of radial channels is bounded by an embossed portion of a first stacked embossed disk and an embossed portion of a second stacked embossed disk in contact with said first stacked embossed disk.

10. The neutron detector of claim 1, wherein each of said plurality of stacked embossed disks comprises a substrate structure on which said coating layer is coated.

11. The neutron detector of claim 1, wherein said plurality of stacked embossed disks has outer peripheral surfaces located at a same distance from said anode wire as outermost portions of said plurality of radial channels, and said outer peripheral surfaces are spaced from said tubular conductive cathode by a substantially same distance.

12. The neutron detector of claim 1, wherein said plurality of stacked embossed disks has outer peripheral surfaces located at a same distance from said anode wire as outermost portions of said plurality of radial channels, and said outer peripheral surfaces of said plurality of stacked embossed disks have a honeycomb pattern.

13. The neutron detector of claim 1, wherein a portion of said wire anode is in a line-of-sight from each point within said radial channel.

14. The neutron detector of claim 13, wherein an inner surface of said tubular conductive cathode is in another line-of-sight from each point within said radial channel.

15. The neutron detector of claim 1, wherein said frame structure comprises at least one substrate structure on which said coating layer is coated.

16. The neutron detector of claim 15, wherein said substrate structure comprises a plastic material, a ceramic material, or glass.

17. The neutron detector of claim 15, wherein said frame structure comprises at least one of biaxially-oriented polyethylene terephthalate (BoFET), polytetrafluoroethylene (PTFE), polychlorotrifluoroethylene (PCTFE), polyphenylene sulphide (PPS), polyetheretherketone (PEEK), polyethylene, polyimide, and poly(4,4'- oxydiphenylene-pyromellitimide).

18. The neutron detector of claim 15, wherein said substrate structure has a resistivity in a range from $1.0 \times 10^7$ $\Omega$-cm to $1.0 \times 10^{14}$ $\Omega$-cm.

19. The neutron detector of claim 1, wherein said tubular conductive cathode has a horizontal cross-sectional shape of an ellipse or a polygon.

20. The neutron detector of claim 1, wherein said tubular conductive cathode, said wire anode, and said frame structure collectively constitute a cylindrical neutron detector unit, and said neutron detector comprises a plurality of cylindrical neutron detector units including said cylindrical neutron detector unit and at least another cylindrical neutron detector unit, each of which comprising another tubular conductive cathode, another wire anode, and another frame structure.

21. The neutron detector of claim 20, wherein said wire anode and each of said another wire anode are electrically connected to a positive voltage supply node, and said tubular conductive cathode and each of said at least one another tubular conductive cathode are electrically connected to a negative voltage supply node.

22. The neutron detector of claim 21, further comprising:
a direct current (DC) voltage supply source connected across said positive voltage supply node and said negative voltage supply node; and
a current measurement device connected in series with said direct current voltage supply source.

23. The neutron detector of claim 1, further comprising a moderator unit located on an outside of, or in a vicinity of, said tubular conductive cathode.

24. The neutron detector of claim 1, further comprising another coating layer located on an inner surface of said tubular conductive cathode and comprising said neutron-absorbing material or another neutron-absorbing material.

25. The neutron detector of claim 1, wherein said tubular conductive cathode is a portion of an air-tight enclosure in which said frame structure and a portion of said wire anode are enclosed.

26. A method of detecting neutrons comprising:
providing a neutron detector of claim 1; and
applying a direct current (DC) voltage bias across said wire anode and said tubular conductive cathode; and
detecting neutrons by measuring current pulses that flow through a circuit of said neutron detector.

27. A neutron detector comprising:
at least one panel including a plurality of channels therethrough and spaced from each other along a first direction, wherein each of said plurality of channels is laterally surrounded by a coating layer of a neutron-absorbing material and extends along said first direction;
at least one cathode plate located at least on one side of each of said at least one panel; and
a first array of first substantially parallel wire anodes located on another side of each of said at least one panel and extending along a second direction that is perpendicular to said first direction and spaced from said each of said at least one panel along said first direction by a first distance; and
a second array of second substantially parallel wire anodes located on said another side of each of said at least one panel, spaced from said first array and extending along a third direction that is perpendicular to said first direction and said second direction and spaced from said each of said at least one panel along said first direction and spaced from said each of said at least one panel along said first direction by a second distance that is different from said first distance.

28. The neutron detector of claim 27, wherein said neutron-absorbing material includes at least one of a boron-containing material and a lithium-containing material.

29. The neutron detector of claim 27, wherein said neutron-absorbing material is a boron-containing material that includes boron at an atomic concentration greater than 5%.

30. The neutron detector of claim 27, wherein said neutron-absorbing material is a carborane or a derivative of a carborane.

31. The neutron detector of claim 27, wherein said neutron-absorbing material is a lithium-containing material that includes lithium at an atomic concentration greater than 5%.

32. The neutron detector of claim 27, wherein said coating layer is a solid coating layer having a thickness from 10 nm to 2,000 nm.

33. The neutron detector of claim 27, wherein each of said plurality of channels has a cross-sectional area that is independent of a distance from said array of substantially parallel wire anodes.

34. The neutron detector of claim 33, wherein said cross-sectional area is a polygonal cross-sectional area.

35. The neutron detector of claim 34, wherein said cross-sectional area is a hexagonal cross-sectional area.

36. The neutron detector of claim 27, wherein each of said plurality of channels has a cross-sectional area that increases with a distance from said array of substantially parallel wire anodes.

37. The neutron detector of claim 36, wherein said cross-sectional area is a polygonal cross-sectional area.

38. The neutron detector of claim 37, wherein said polygonal cross-sectional area has a polygonal cross-sectional shape that has a constant vertical dimension along said second direction irrespective of said distance from said first array of first substantially parallel wire anodes, and has a varying lateral dimension in said third direction that increases with said distance from said first array of first substantially parallel wire anodes.

39. The neutron detector of claim 37, wherein said polygonal cross-sectional area has a polygonal cross-sectional shape that changes dimensions of sides in proportion to said distance from said first array of first substantially parallel wire anodes.

40. The neutron detector of claim 36, wherein said cross-sectional area has an elliptical cross-sectional shape that has a constant vertical dimension along said second direction irrespective of said distance from said first array of first substantially parallel wire anodes, and has a varying lateral dimension in said third direction that increases with said distance from said first array of first substantially parallel wire anodes.

41. The neutron detector of claim 36, wherein said cross-sectional area has an elliptical cross-sectional shape that changes dimensions in proportion to said distance from said first array of first substantially parallel wire anodes while maintaining a same ellipticity.

42. The neutron detector of claim 27, wherein said at least one panel comprises a pair of panels separated by a spacing, and said first array of first substantially parallel wire anodes is located within said spacing.

43. The neutron detector of claim 27, wherein a portion of said first array of first substantially parallel wire anodes is in a line-of-sight from each point within said channel.

44. The neutron detector of claim 43, wherein an inner surface of said at least one cathode plate is in another line-of-sight from each point within said channel.

45. The neutron detector of claim 27, wherein said at least one panel comprises at least one substrate structure on which said coating layer is coated.

46. The neutron detector of claim 45, wherein said substrate structure comprises a plastic material, a ceramic material, or glass.

47. The neutron detector of claim 45, wherein said frame structure comprises at least one of biaxially-oriented polyethylene terephthalate (BoFET), polytetrafluoroethylene (PTFE), polychlorotrifluoroethylene (PCTFE), polyphenylene sulphide (PPS), polyetheretherketone (PEEK), polyethylene, polyimide, and poly(4,4'-oxydiphenylene-pyromellitimide).

48. The neutron detector of claim 45, wherein said substrate structure has a resistivity in a range from $1.0 \times 10^7$ Ω-cm to $1.0 \times 10^{14}$ Ω-cm.

49. The neutron detector of claim 27, wherein said first array of first substantially parallel wire anodes is electrically connected to a positive voltage supply node, and said at least one cathode plate is electrically connected to a negative voltage supply node.

50. The neutron detector of claim 49, further comprising:
a direct current (DC) voltage supply source connected across said positive voltage supply node and said negative voltage supply node; and
a current measurement device connected in series with said direct current voltage supply source.

51. The neutron detector of claim 27, wherein said at least one panel is a plurality of panels, and said neutron detector further comprises a moderator unit located around said plurality of panels.

52. The neutron detector of claim 51, further comprising a moderator unit located between a pair of planar neutron detector units selected among said plurality of neutron detector units.

53. The neutron detector of claim 27, wherein at least one panel, said at least one cathode plate, said first array of first substantially parallel wire anodes, and said second array of second substantially parallel wire anodes collectively constitute a planar neutron detector unit.

54. The neutron detector of claim 27, further comprising another coating layer located on an inner surface of said at least one cathode plate and comprising said neutron-absorbing material or another neutron-absorbing material.

55. The neutron detector of claim 27, wherein said at least one cathode plate is a portion of an air-tight enclosure in which said at least one panel and a portion of said array of substantially parallel wire anodes are enclosed.

56. A method of detecting neutrons comprising:
   providing a neutron detector of claim 27; and
   applying a direct current (DC) voltage bias across said array of substantially parallel wire anodes and said at least one cathode plate; and
   detecting neutrons by measuring current pulses that flow through a circuit of said neutron detector.

\* \* \* \* \*